(12) United States Patent
Ito

(10) Patent No.: US 6,940,603 B2
(45) Date of Patent: Sep. 6, 2005

(54) OPTICAL ENCODER

(75) Inventor: Takeshi Ito, Hino (JP)

(73) Assignee: Olympus Corporation, Tokyo (JP)

( * ) Notice: Subject to any disclaimer, the term of this patent is extended or adjusted under 35 U.S.C. 154(b) by 335 days.

(21) Appl. No.: 10/277,511

(22) Filed: Oct. 22, 2002

(65) Prior Publication Data

US 2003/0076507 A1 Apr. 24, 2003

(30) Foreign Application Priority Data

Oct. 23, 2001 (JP) .................................. 2001-324461

(51) Int. Cl.$^7$ .............................. G01B 9/02; H01J 5/16
(52) U.S. Cl. ................................. 356/499; 250/237 G
(58) Field of Search .................. 356/499; 250/237 G, 250/231.14

(56) References Cited

U.S. PATENT DOCUMENTS

| | | | |
|---|---|---|---|
| 4,395,124 A | | 7/1983 | Remijan |
| 4,823,001 A | | 4/1989 | Kobayashi et al. |
| 5,428,445 A | * | 6/1995 | Holzapfel .................. 356/499 |
| 5,991,249 A | * | 11/1999 | Lee ......................... 369/44.42 |
| 6,800,842 B2 | * | 10/2004 | Ito ........................ 250/231.13 |

FOREIGN PATENT DOCUMENTS

| | | |
|---|---|---|
| JP | 63-47616 | 2/1988 |
| JP | 4-357414 | 12/1992 |
| JP | 11-120724 | 4/1999 |
| JP | 2000-205819 | 7/2000 |
| JP | 2000-337816 | 12/2000 |
| JP | 2001-174291 | 6/2001 |
| JP | 2002-48602 | 2/2002 |
| JP | 2002-139353 | 5/2002 |

* cited by examiner

Primary Examiner—Gregory J. Toatley, Jr.
Assistant Examiner—Patrick J. Connolly
(74) Attorney, Agent, or Firm—Scully, Scott, Murphy & Presser

(57) ABSTRACT

A surface-emitting laser is disposed on a photodetector disposed in parallel with a scale, so that an optical pattern surface of the scale can be irradiated with a light beam having a desired shape. A major axis of the light beam emitted from the surface-emitting laser is vertical to the photodetector, and forms a beam spot on the optical pattern surface of the scale. A light emission portion of the light source is disposed in a 0-order diffracted light region from the scale and other than a region in which only a 0-order diffracted light and $1^{st}$-order diffracted light or a 0-order diffracted light and $-1^{st}$-order diffracted light interfere. A light shield metal and/or a dummy light receiving portion are/is disposed to surround a light receiving portion outer periphery, and is disposed in a region between an inner periphery of the light receiving portion and the surface-emitting laser.

14 Claims, 18 Drawing Sheets

OPTICAL ENCODER

CROSS-REFERENCE TO RELATED APPLICATIONS

This application is based upon and claims the benefit of priority from the prior Japanese Patent Application No. 2001-324461, filed Oct. 23, 2001, the entire contents of which are incorporated herein by reference.

BACKGROUND OF THE INVENTION

1. Field of the Invention

The present invention relates to an optical displacement sensor using optical means, particularly to an optical encoder.

2. Description of the Related Art

At present, a so-called encoder which is optical or magnetic has been used to detect a linear directional displacement amount in a stage of a machine tool or a three-dimensional measurement instrument, or to detect a rotation angle in a servo motor.

The optical encoder generally includes a scale fixed to a member whose displacement is to be detected, such as a stage, and a sensor head which detects the displacement of the scale. The sensor head includes a light source which irradiates the scale with a light beam, and a photodetector for detecting a diffracted light passed therethrough or reflected by the scale, and detects movement of the scale in accordance with a change of intensity of a received light signal.

FIG. 21 shows a laser encoder in which a coherent light source and diffraction grating scale are used according to a first prior art. FIG. 21 is a constitution diagram showing the laser encoder as one example of a small-sized inexpensive encoder which does not require optical components such as a lens. This laser encoder using the coherent light source and diffraction grating scale is described, for example, in "Jpn. Pat. Appln. KOKAI Publication No. 63-47616".

That is, as shown in FIG. 21, the laser encoder is constituted such that a transmission type diffraction grating scale 2 is irradiated with a light beam emitted from a semiconductor laser as a surface-emitting laser 1, and specific portions of a diffractive interference pattern 13 generated thereby are passed through transmission slits 53 disposed at a slit pitch p2 and detected by a photodetector 5.

An operation of the first prior art will be described with reference to FIG. 22. In FIG. 22, it is assumed that light receiving areas 4 are formed on photodetectors 3, and the transmission slits 53 and photodetectors 5 are integrally formed.

Here, as shown in FIG. 22, constitution parameters are defined as follows:

z1: a distance between a light source and a plane on which a diffraction grating is formed on the scale;

z2: a distance between the plane on which the diffraction grating is formed on the scale and a light receiving surface of the photodetector;

p1: a pitch of the diffraction gratings on the scale; and p2: a pitch of a diffractive interference pattern on the light receiving surface of the photodetector.

It is to be noted that the "pitch of the diffraction gratings on the scale" means a spatial period of a pattern which is formed on the scale and whose optical characteristics are modulated.

Moreover, the "pitch of the diffractive interference pattern on the light receiving surface of the photodetector" means the spatial period of an intensity distribution of the diffractive interference pattern generated on the light receiving surface.

Additionally, according to a diffraction theory of light, when z1, z2 defined as described above are in a specific relation satisfying a relation shown in the following equation (1), an intensity pattern analogous to the diffraction grating pattern of the scale is generated on the light receiving surface of the photodetector.

$$\frac{1}{z1} + \frac{1}{z2} = \frac{\lambda}{k \cdot (p1)^2}, \quad (1)$$

in which $\lambda$ is a wavelength of the light beam emitted from the light source and k is a natural number.

The intensity pattern which is generated on the light receiving surface and which is analogous to the diffraction grating pattern of the scale is called a Talbot image, and appears in a position which satisfies the above relation equation. This effect is called a Talbot effect.

In this case, the pitch p2 of the diffractive interference pattern on the light receiving surface can be represented by the following equation (2).

$$p2 = p1 \cdot \frac{z1 + z2}{z1} \quad (2)$$

When the scale is displaced in a pitch direction of the diffraction grating with respect to the light source, the same spatial period is kept and the intensity distribution of the diffractive interference pattern moves in a direction of displacement of the scale. Therefore, a value of a spatial period p20 of the light receiving areas 4 formed on the photodetectors 3 is set to the same value as that of p2. Then, every time the scale moves by p1 in the pitch direction, a periodic intensity signal is obtained from the photodetector. Therefore, the displacement amount of the scale in the pitch direction can be detected.

Next, FIG. 23 shows the optical encoder according to a second prior art. In FIG. 23, to further miniaturize the first prior art, a light source 1 is disposed on the photodetector 3. The first prior art relates to the transmission type encoder, whereas the second prior art relates to a reflection type encoder. Another constitution is similar to that of the first prior art.

That is, the laser encoder is constituted such that a reflection type diffraction grating scale 2 is irradiated with a laser beam emitted from the semiconductor laser 1 as a coherent light source, and the specific portions of the diffractive interference pattern generated thereby are detected by the photodetector 3.

For the operation of the second prior art, description of a part similar to that of the first prior art is omitted, and only a different part will be described.

For the light beam emitted from the light source 1, the scale 2 is substantially vertically irradiated with a major axis 100 of the light beam, and the light reflected by the scale 2 forms the diffractive interference pattern on the light receiving surface of the photodetector 3. This diffractive interference pattern is similar to the diffraction grating having the pitch p1 on the scale 2 on a condition that positional relation of a light beam emission aperture of the light source 1, light receiving surface of the photodetector 3, and diffractive interference pattern of the scale 2 satisfies the equation (1). The diffractive interference pattern has a period of a pitch p2 enlarged by a magnification calculated by the equation (2).

When the scale 2 is displaced in the pitch direction of the diffraction grating with respect to the light source 1, the same spatial period is kept and the intensity distribution of the diffractive interference pattern moves in the direction of the displacement of the scale. Therefore, every time the scale moves by p1 in the pitch direction, the periodic intensity signal is obtained from the photodetector. Therefore, the displacement amount of the scale in the pitch direction can be detected.

The optical encoder is of a non-contact system with high precision and resolution, and has characteristics such as a superior resistance to an electromagnetic wave trouble. Therefore, the encoder is used in various fields. Particularly in the encoder requiring the high precision and resolution, an optical system is a mainstream.

However, the conventional optical encoder has the following problems.

A first problem is that an output signal from the photodetector is strongly influenced by the diffractive interference pattern incident upon a light receiving area peripheral portion.

In general, in the small-sized optical encoder shown in FIGS. 21 to 23, the photodetector integrated on a semiconductor substrate is used. Moreover, the light receiving portion 4 of the photodetector 3 is disposed only in a region in which the diffractive interference pattern 13 having a sufficient intensity is obtained, and the semiconductor substrate is optically exposed outside the region. Additionally, a main diffracted light from the diffraction grating scale 2 is incident upon the light receiving portion 4, but a part of the light is incident upon a semi-conductor substrate portion other than the light receiving area. The light incident upon the region other than the light receiving portion 4 is a factor for generating an error.

The above-described problem will be described in detail with reference to FIGS. 24A, 24B. FIGS. 24A, 24B show an example of a light receiving area array in which a plurality of light receiving areas are disposed adjacent to one another. When the light is incident upon the photodetector, the light is absorbed by a depletion layer or substrate to generate an electron/hole pair, and is detected as a current.

When the light incident upon the light receiving area 4 is absorbed by the depletion layer in the light receiving area array, the electron/hole pair is generated in the depletion layer. Since an electric field exists in a vertical direction in the depletion layer, the electron/hole pair is taken into a lead electrode of the light receiving area because of the influence of the electric field. That is, the light absorbed in the depletion layer of a certain light receiving area is detected by the light receiving area.

On the other hand, the electron/hole pair by the light incident upon a region in which the light receiving area is not formed in the vicinity of the light receiving area array is absorbed by the light receiving area of the light receiving area array end. As a result, the light is detected as if apparently much light were incident upon the light receiving area of the light receiving area array end.

That is, for the light receiving area of the photodetector, a part of the light incident upon the region in which the light receiving area is not formed is also detected, and a measurement error is generated. Particularly, as shown in FIG. 22, when the light source and the light receiving areas of the photodetector are disposed adjacent to one another, the light beam having a high intensity as compared with the periphery is incident upon the light receiving area end in the vicinity of the light source (coherent light source outer peripheral portion and light receiving area boundary portion) and the problem is serious.

A second problem relates to stability of a light beam intensity of the light source. That is, with the reflection type encoder shown in FIG. 23, a predetermined portion including the major axis of the light beam emitted from the light source, that is, a portion having a highest light intensity is reflected by the scale, and is incident upon the light source in the constitution.

In principle, as shown in FIG. 25, for the diffracted light of the surface-emitting laser 1 diffracted by the diffraction grating, particularly a hatching region in which 0-order and $\pm 1^{st}$-order lights interfere generates a strong interference pattern. Moreover, in the reflection type optical encoder shown in FIG. 23, since the diffractive interference pattern by the reflected light moves with the movement of the scale, the light intensity incident upon the emission window of the light source changes with the movement of the scale.

Additionally, in general, it is known that an external light having a high intensity is incident upon the emission window of the light source and then the output intensity of the light beam emitted from the light source is influenced. With the change of the intensity of the external light, the output of the light beam from the light source also changes. When the semiconductor laser such as the surface-emitting laser is used as the light source, the scale functions as an external mirror and forms a complex resonator system, and the influence becomes remarkable.

That is, with the arrangement of the light source in the position shown in FIG. 26, there is a problem that the output intensity of the light beam emitted from the light source changes with the movement of the scale. Therefore, it is possibly difficult to accurately detect the movement of the scale.

Therefore, an object of the present invention is to provide an optical encoder which is miniaturized, which can stabilize the light beam intensity of the light source and the output signal from the photodetector and which is little in detection error and satisfactory in precision.

BRIEF SUMMARY OF THE INVENTION

To achieve the above-described object, according to a first aspect of the present invention, there is provided an optical encoder comprising:

a substrate;

a coherent light source which is fixed to the substrate to emit a light beam;

a scale which is apart from the coherent light source as much as a predetermined distance and which is relatively displaced to intersect the light beam and in which an optical pattern having a predetermined period is formed to generate a diffractive interference pattern by the light beam; and a photodetector which is fixed to the substrate to detect the diffractive interference pattern generated by the optical pattern, wherein when the light beam is diffracted by the scale, a plus first-order diffracted light, a zero-order diffracted light, and a minus first-order diffracted light are generated, and a light beam emission portion of the coherent light source is disposed in a region other than a region in which only the plus first-order diffracted light and the zero-order diffracted light interfere, and other than a region in which only the minus first-order diffracted light and the zero-order diffracted light interfere.

The optical encoder according to a second aspect of the present invention relates to the optical encoder according to the first aspect of the present invention, and the light beam emission portion of the coherent light source is disposed in a region in which any diffracted light of a plus second-order diffracted light, plus first-order diffracted light, zero-order diffracted light, minus first-order diffracted light, and minus second-order diffracted light exists.

The optical encoder according to a third aspect of the present invention relates to the optical encoder according to the first aspect of the present invention, and the light beam emission portion of the coherent light source is disposed in a region between a region in which only a plus first-order diffracted light and zero-order diffracted light interfere and a region in which only a minus first-order diffracted light and zero-order diffracted light interfere.

The optical encoder according to a fourth aspect of the present invention relates to the optical encoder according to the first aspect of the present invention, and a light receiving portion of the photodetector is disposed to receive the light of at least a part of a region in which only the plus first-order diffracted light and zero-order diffracted light interfere or a region in which only the minus first-order diffracted light and zero-order diffracted light interfere.

According to a fifth aspect of the present invention, there is provided an optical encoder comprising:

a coherent light source which emits a light beam;

a scale which is apart from the coherent light source as much as a predetermined distance and which is relatively displaced to intersect the light beam and in which an optical pattern having a predetermined period is formed to generate a diffractive interference pattern by the light beam;

a photodetector which detects the diffractive interference pattern generated by the optical pattern; and a dummy light receiving portion disposed in at least a part of a region adjacent to a light receiving portion disposed on the photodetector.

The optical encoder according to a sixth aspect of the present invention relates to the optical encoder according to the fifth aspect of the present invention, the coherent light source and light receiving portion are disposed on the same substrate, and the dummy light receiving portion is disposed between the coherent light source and light receiving portion.

The optical encoder according to a seventh aspect of the present invention relates to the optical encoder according to the fifth aspect of the present invention, the light receiving portion includes a plurality of light receiving area groups arranged in a spatial period direction of the diffractive interference pattern at a predetermined interval, and the dummy light receiving portion includes a plurality of light receiving area groups arranged at the same interval as the predetermined interval.

The optical encoder according to an eighth aspect of the present invention relates to the optical encoder according to the sixth aspect of the present invention, the light receiving portion includes light receiving areas of n groups which detect signals of phase regions obtained by dividing one period of the diffractive interference pattern by a natural number n, and one dummy light receiving portion is a light receiving area group including n light receiving areas.

The optical encoder according to a ninth aspect of the present invention relates to the optical encoder according to the sixth aspect of the present invention, and a light shield member is disposed at least in a part of a region not included in the light receiving portion or the dummy light receiving portion among a region on the photodetector on which the diffractive interference pattern is projected.

According to a tenth aspect of the present invention, there is provided an optical encoder comprising:

a substrate;

a coherent light source which is fixed to the substrate to emit a light beam;

a scale which is apart from the coherent light source as much as a predetermined distance and which is relatively displaced to intersect the light beam and in which an optical pattern having a predetermined period is formed to generate a diffractive interference pattern by the light beam; and a photodetector which is fixed to the substrate to detect the diffractive interference pattern generated by the optical pattern, wherein a light receiving portion of the photodetector is disposed around the coherent light source and includes a plurality of light receiving area groups arranged substantially in a spatial period direction of the diffractive interference pattern, and at least one of electric wirings connected to the coherent light source is provided substantially in the spatial period direction of the diffractive interference pattern.

The optical encoder according to an eleventh aspect of the present invention relates to the optical encoder according to the tenth aspect of the present invention, and at least one of the electric wirings is a transparent electrode pattern.

The optical encoder according to a twelfth aspect of the present invention relates to the optical encoder according to the tenth aspect of the present invention, and the electric wiring provided substantially in a spatial frequency direction of the diffractive interference pattern is a bonding wire provided substantially in the spatial period direction of the diffractive interference pattern.

According to a thirteenth aspect of the present invention, there is provided an optical encoder comprising:

a substrate;

a coherent light source which is fixed to the substrate to emit a light beam;

a scale which is apart from the coherent light source as much as a predetermined distance and which is relatively displaced to intersect the light beam and in which an optical pattern having a predetermined period is formed to generate a diffractive interference pattern by the light beam; and a photodetector which is fixed to the substrate to detect the diffractive interference pattern generated by the optical pattern, wherein a light receiving portion of the photodetector includes a plurality of light receiving area groups arranged in a spatial period direction of the diffractive interference pattern, and a major axis of the light beam emitted from the coherent light source is passed substantially through a center of the diffractive interference pattern in the spatial period direction on a plane of the light receiving portion and incident upon a linear axis crossing perpendicular to the spatial period direction via the scale.

The optical encoder according to a fourteenth aspect of the present invention relates to the optical encoder according to the thirteenth aspect of the present invention, a light beam emission portion of the coherent light source is disposed on a linear axis passed substantially through a center on the plane of the light receiving portion in the spatial period direction and crossing perpendicular to the spatial period direction, and the major axis of the light beam emitted from the coherent light source is disposed to be substantially vertical to the spatial period direction.

The optical encoder according to a fifteenth aspect of the present invention relates to the optical encoder according to the thirteenth aspect of the present invention, a light beam emission portion of the coherent light source is disposed on a linear axis passed substantially through a center on the plane of the light receiving portion in the spatial period direction and crossing at right angles to the spatial period direction, and the major axis of the light beam emitted from the coherent light source is disposed to be substantially vertical to the plane of the light receiving portion.

According to a sixteenth aspect of the present invention, there is provided an optical encoder comprising:

a coherent light source which emits a light beam;

a scale which is apart from the coherent light source as much as a predetermined distance and which is relatively displaced to intersect the light beam and in which an optical pattern having a predetermined period is formed to generate a diffractive interference pattern by the light beam;

a photodetector which detects the diffractive interference pattern generated by the optical pattern; and a light shield member disposed in a region disposed adjacent to a light receiving portion disposed on the photodetector.

The optical encoder according to a seventeenth aspect of the present invention relates to the optical encoder according to the fifteenth aspect of the present invention, the coherent light source and light receiving portion are disposed on the same substrate, and a light shield member is disposed in at least a portion between the coherent light source and light receiving area.

The optical encoder according to an eighteenth aspect of the present invention relates to the optical encoder according to the first aspect of the present invention, and the coherent light source is integrally formed with the photodetector on the same substrate in a hybrid or monolithic manner.

The optical encoder according to a nineteenth aspect of the present invention relates to the optical encoder according to the first aspect of the present invention, and the coherent light source is a surface-emitting laser.

According to a twentieth aspect of the present invention, there is provided an optical encoder comprising:

a substrate;

a coherent light source which is fixed to the substrate to emit a light beam;

a scale which is apart from the coherent light source as much as a predetermined distance and which is relatively displaced to intersect the light beam and in which an optical pattern having a predetermined period is formed to generate a diffractive interference pattern by the light beam; and a photodetector which is fixed to the substrate to detect the diffractive interference pattern generated by the optical pattern, wherein when the light beam is diffracted by the scale, a plus first-order diffracted light, a zero-order diffracted light, and a minus first-order diffracted light are generated, and a light beam emission portion of the coherent light source is disposed in a region other than a region in which only the plus first-order diffracted light and the zero-order diffracted light interfere, and other than a region in which only the minus first-order diffracted light and the zero-order diffracted light interfere, and disposed on a linear axis passed substantially through a center on the plane of the light receiving portion substantially in the spatial period direction of the diffractive interference pattern and crossing perpendicular to the spatial period direction, and the major axis of the light beam emitted from the coherent light source is disposed to be substantially vertical to the spatial period direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described hereinafter with reference to the drawings.

(First Embodiment)

A first embodiment relates to a reflection type optical encoder, and this encoder will be described with reference to FIGS. 1 to 8.

(Whole Constitution)

Figure 1:
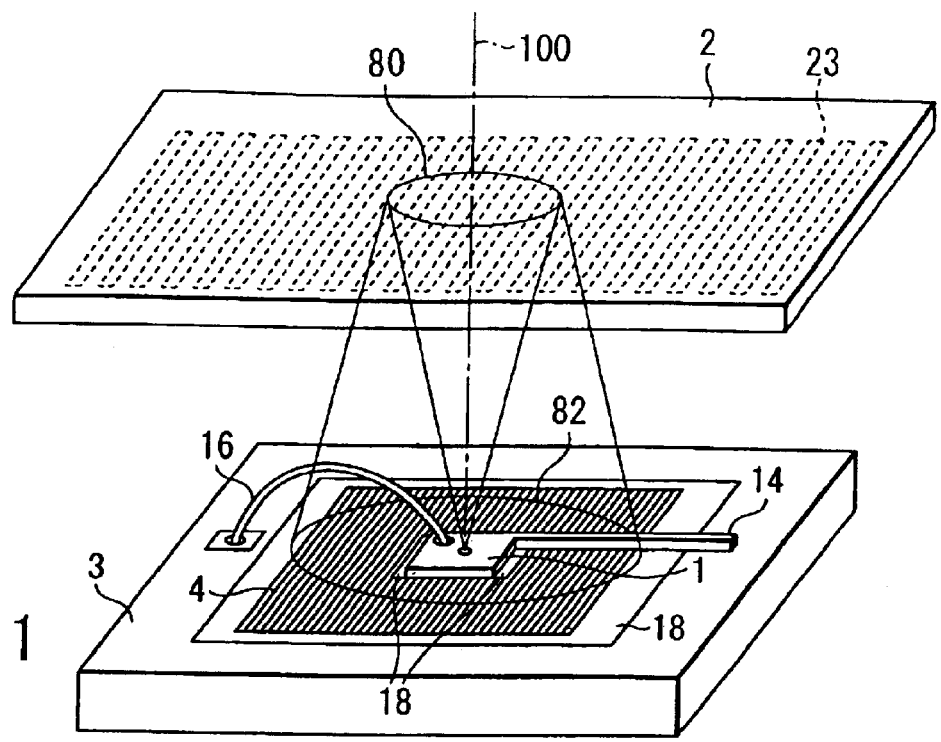
FIG. 1 is a perspective view showing a constitution of an optical encoder according to a first embodiment of the present invention.

The reflection type laser encoder shown in FIG. 1 is constituted to irradiate a reflection type scale 2 with a light beam emitted from a surface-emitting laser 1 as a coherent light source, and to detect a predetermined portion of a diffractive interference pattern generated by the beam by a photodetector 3. It is to be noted that the surface-emitting laser 1 is a coherent light source capable of controlling a beam divergence angle without using any optical member such as a lens.

The surface-emitting laser 1 is disposed on the photodetector 3 disposed substantially in parallel with the scale 2, so that an optical pattern surface of the scale 2 can be irradiated with the light beam having a desired shape. Since a major axis 100 of the light beam emitted from the surface-emitting laser 1 is substantially vertical to the photodetector 3, the axis is constituted to be substantially vertically incident upon an optical pattern surface of the scale 2 and to form a beam spot 80. Additionally, the major axis of the light beam mentioned herein means a center axis of the light beam emitted from the light source.

In the scale 2, an optical pattern 23 is formed so that a reflection portion and non-reflection portion have a period p1 in a movement direction of the scale, and a light receiving portion 4 which detects a reflected light from the optical pattern 23 is disposed to surround the surface-emitting laser 1 on a plane in which the surface-emitting laser 1 is disposed.

Figure 2:
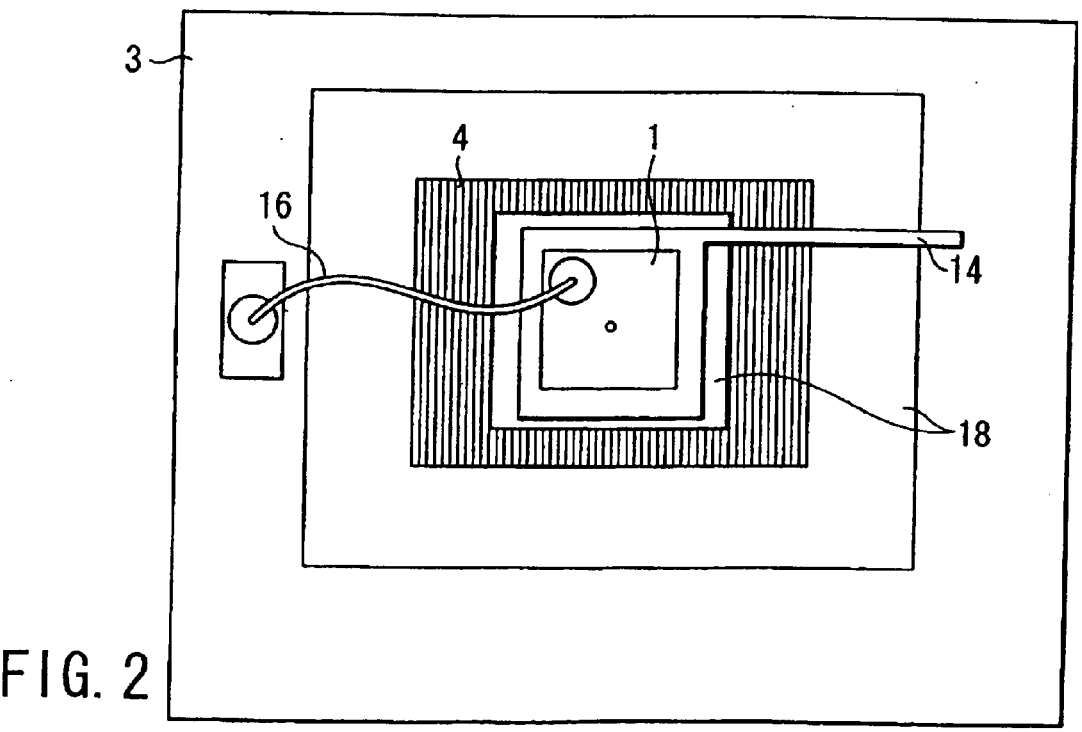
FIG. 2 is a plan view showing a constitution of a photodetector according to the first embodiment of the present invention.

FIG. 2 shows a plan view of the photodetector 3 according to the present embodiment. The light receiving portion 4 is divided into a plurality of light receiving areas in a movement direction of the scale (period direction of optical characteristics of the scale) at a predetermined pitch based on equations (1) and (2), and a wire connection described later is constituted so that the interference pattern from the scale 2 can be detected.

Moreover, a positional relation of the light receiving portion 4 and a light beam emission aperture of the light source 1 is constituted such that the light beam emission aperture of the light source 1 is disposed substantially in a center of the light receiving portion 4. The light beam emitted from the light source 1 has an intensity distribution approximated, for example, by Gaussian beam. Therefore, the intensity distribution of the diffractive interference pattern formed by the reflected light by the scale 2 is also an intensity distribution approximated by Gaussian distribution. As shown in FIG. 1, since the light source 1 is disposed substantially in parallel with the scale, the major axis of the light beam emitted from the light source 1 returns to the light beam emission aperture of the light source 1 via the scale. Therefore, the diffractive interference pattern by the reflected light of the scale 2 has an intensity distribution symmetric centering on the light beam emission aperture of the light source 1. Therefore, even when parallelism of the scale 2 and photodetector 3 changes by a slight amount, a stable diffractive interference pattern is incident upon the light receiving portion 4 disposed around the light source, and therefore stable detection is possible.

Moreover, light shield members which shield the light incident upon the region, for example, light shield metals 18 are disposed to surround an outer periphery of the light receiving portion 4. The light shield metal 18 is also disposed in a region between an inner periphery of the light receiving portion 4 and the surface-emitting laser 1, and an influence of the light incident upon a region other than the light receiving portion is eliminated.

(Distance Relation of Light Source and Scale)

A position where the coherent light source is disposed will next be described with reference to FIG. 3. The lights from the surface-emitting laser 1 of FIG. 3 indicate 0-order and $\pm 1^{st}$-order diffracted lights having reached the diffraction scale 2. In the drawing, regions 51 and 52 indicate regions where "0-order diffracted light (direct light) and $+1^{st}$-order diffracted light" and "0-order and $-1^{st}$-order diffracted lights" interfere. In the regions 51 and 52, intensities are highest, and the diffracted lights different from each other by one order interfere with each other. Therefore, it can be said that in the regions a diffractive interference pattern having a largest displacement is obtained.

It is to be noted that here only the 0-order diffracted light and $1^{st}$-order diffracted light, and 0-order diffracted light and $-1^{st}$-order diffracted light have been described. Higher-order diffracted lights such as $\pm 2^{nd}$-order diffracted light have a low light intensity as compared with the above-described three diffracted lights, therefore have substantially little influence, and can be ignored.

Figure 3:
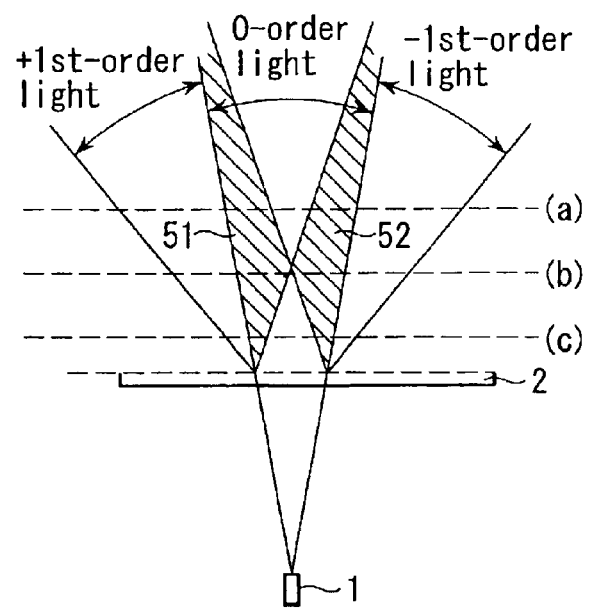
FIG. 3 is a diagram showing a light source, diffraction grating, and interference pattern generation portion and area.
Figure 4A:
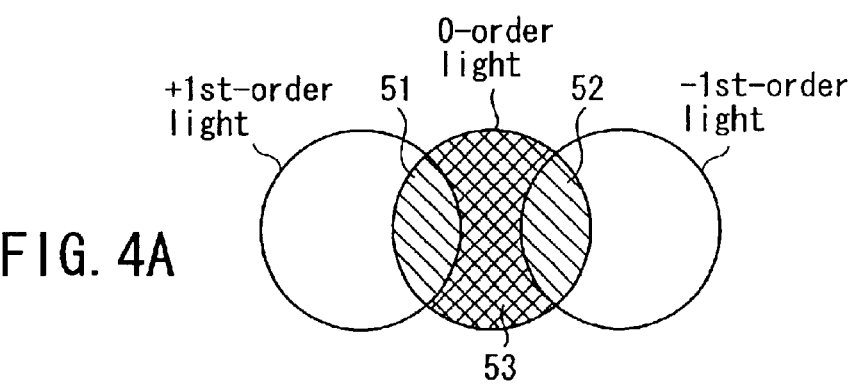
FIGS. 4A, 4B, 4C are diagrams showing interference regions of a sectional direction in positions (a), (b), (c) of FIG. 3.
Figure 4B:
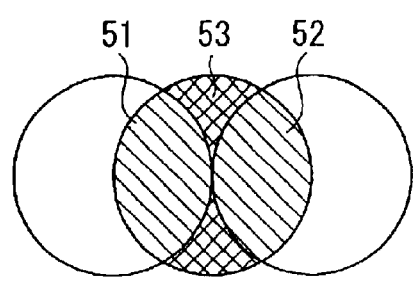
Figure 4C:
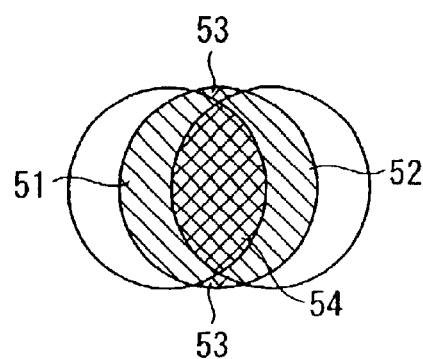

Here, sections of the respective regions in FIGS. 3(*a*), (*b*), (*c*) are shown in FIGS. 4A, 4B, 4C. In the drawing, the regions 51 and 52 are interference regions of the 0-order diffracted light and $\pm 1^{st}$-order diffracted light, and in the regions the interference patterns having a large difference of the light intensity appear.

Therefore, the light emission portion of the light source 1 is disposed in a portion upon which a light having a little difference the light intensity is incident avoiding the regions, and it is thereby possible to reduce a possibility of oscillation of the light source.

Figure 5A:
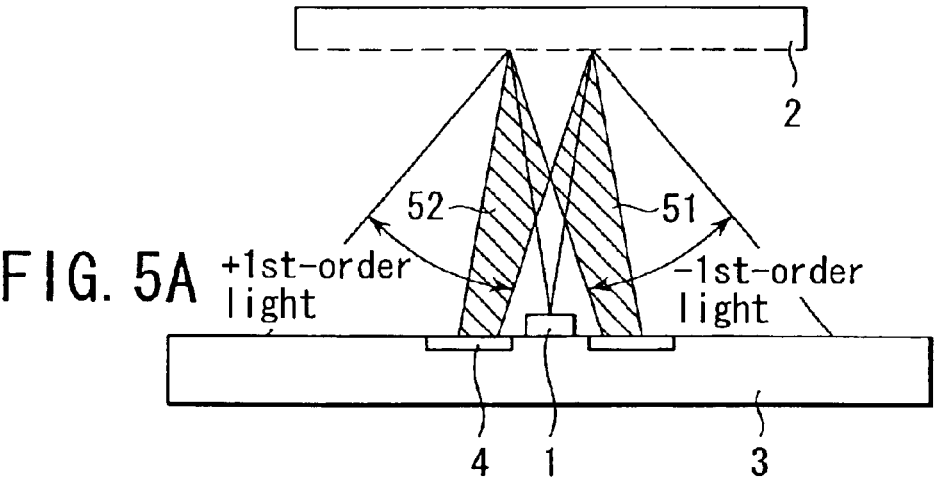
FIGS. 5A, 5B are diagrams of an arrangement position of a laser according to the first embodiment of the present invention.
Figure 5B:
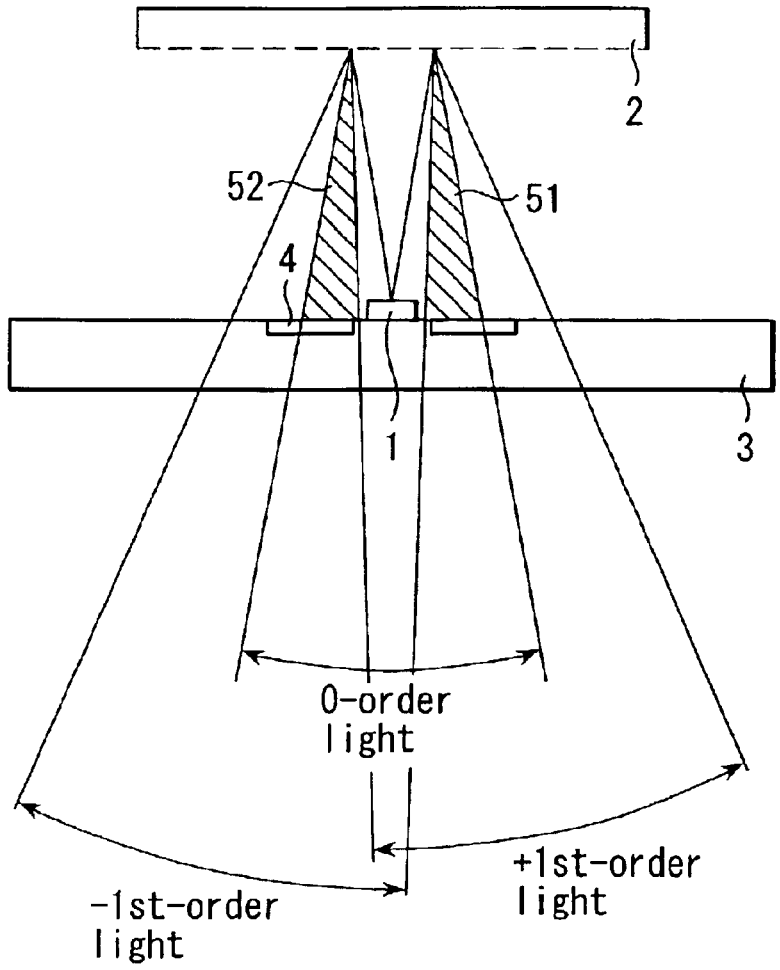

In the present embodiment, in regions 53 and 54 in FIGS. 4A, 4B, 4C, in other words, in "a 0-order diffracted light region and a region other than a region in which only the 0-order and $1^{st}$-order diffracted lights, or the 0-order and $-1^{st}$-order diffracted lights interfere", the light emission portion of the light source 1 is disposed as shown in FIG. 5A or 5B.

(Photodetector Constitution)

Figure 6:
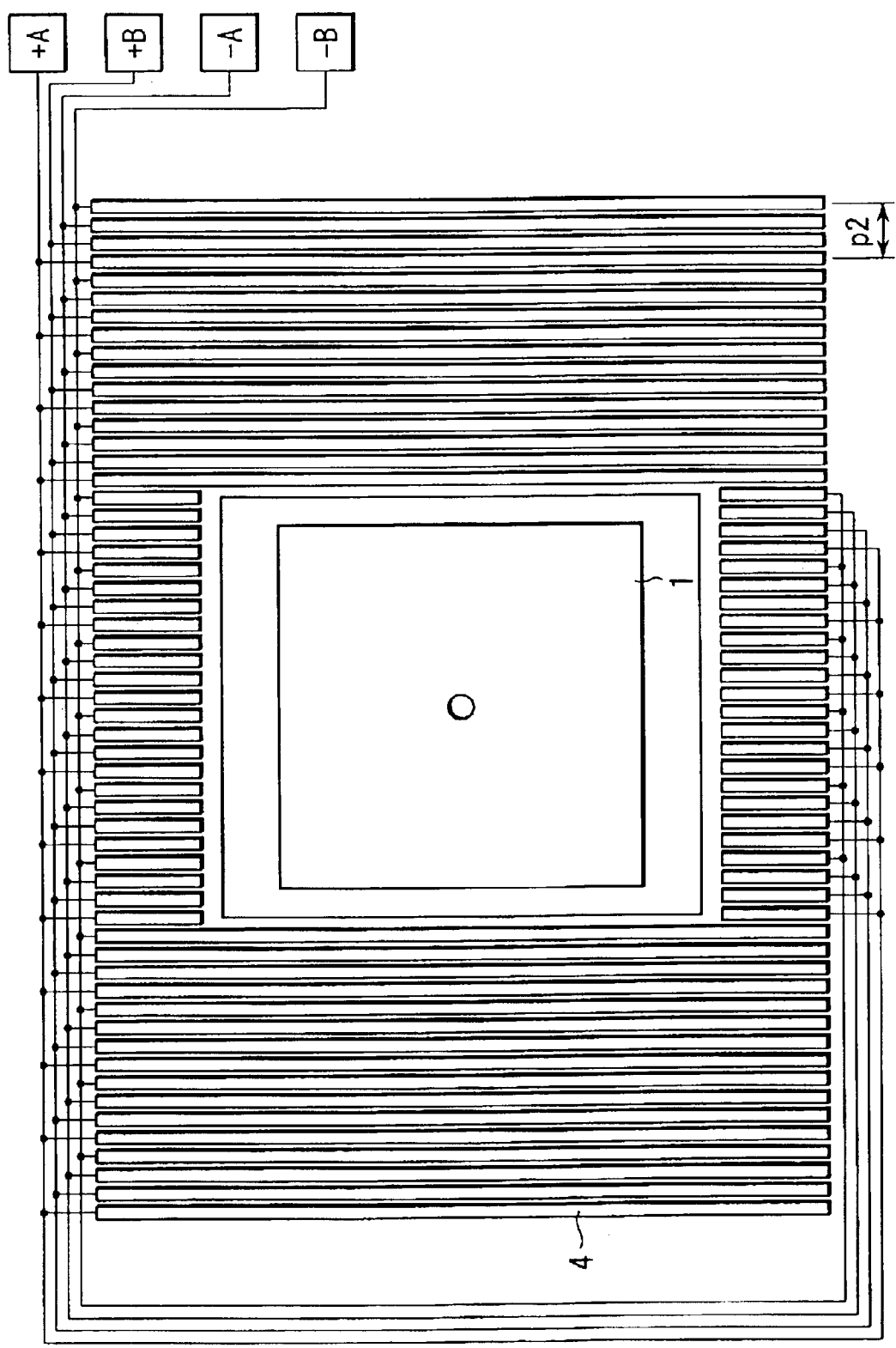
FIG. 6 is a diagram showing a light receiving portion wire connection of the photodetector according to the first embodiment of the present invention.

As shown in FIG. 6, the light receiving portion 4 of the present photodetector 3 is constituted by groups including a plurality of light receiving areas. That is, the light receiving portion 4 is constituted of four groups +A, +B, −A, −B of light receiving areas. The light receiving areas constituting these groups are arranged so that a pitch with respect to the light receiving area belonging to the same group in a period direction is p2×n (n=1, 2, 3, . . . ). Moreover, the regions are disposed so that an interval from the adjacent light receiving area is (p2/4)×m (m=1, 2, 3, . . . ). FIG. 6 shows a case of n=m=1. Each group is comprised of a plurality of light receiving areas disposed with a predetermined pitch and respective ones of the light receiving areas of each group are disposed side by side so as to be included in the predetermined pitch. Moreover, in the light receiving portion 4, each group is electrically connected, and the portion is constituted such that a sum of outputs from the respective light receiving areas constituting the group can be outputted for each group. The output signals from these four light receiving area groups are referred to as +A, +B, −A, −B, and inputted into a signal processing circuit (not shown) integrated on the photodetector 3 as described later. The signal processing circuit is constituted to obtain a difference between the output of the group +A and the output of the group −A to generate/output an A-phase signal, and to obtain a difference between the output of the group +B and the output of the group −B to generate/output a B-phase signal.

When the A, B-phase signals are outputted in this manner, a signal level is inhibited from changing by influences such as an external light, and a stable signal output can be obtained. Moreover, as in the present embodiment, the respective groups of the light receiving portion 4 for outputting the A, B-phase signals are disposed in the same plane in such a way that respective ones of the light receiving areas of each group are disposed within the pitch, so that the photodetector 3 can be miniaturized, the output signal can be obtained from the same region of the diffractive interference pattern, and more stable signals can be obtained.

The arrangement of the light shield metals 18 will next be described.

Figure 8:
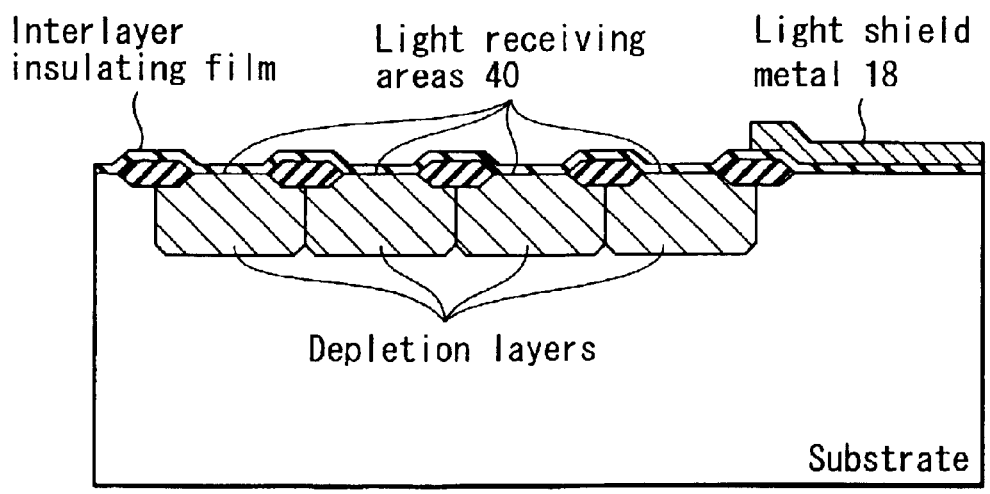
FIG. 8 is an enlarged sectional view of a light receiving portion end vicinity according to the first embodiment of the present invention.

FIG. 8 shows a sectional view of a light receiving portion 4 end. In a region other than the light receiving portion 4, the light shield metal is formed as shown in FIG. 8. The light receiving portion 4 formed on the photodetector 3 is formed so as to surround the surface-emitting laser light source 1, and the light shield metals 18 are formed on both the outer periphery of the light receiving portion 4, and a side contacting a lower electrode of the surface-emitting laser 1. The light receiving portion 4 is formed by a plurality of light receiving areas, and an interlayer insulating film is formed on the upper surface so that all the light receiving areas are coated. Moreover, the light shield metals 18 are formed in a position relation shown in FIG. 8 on the interlayer insulating film. By this constitution, it is possible to form the light shield metals 18 up to last edges of the light receiving areas.

(Wiring Arrangement)

Moreover, as shown in FIG. 1, the light receiving portion 4 is formed to surround the light source 1, and a wiring 14 from the lower electrode of the light source 1 and bonding wire 16 from an upper electrode are drawn out in an arrangement direction of the light receiving areas. In the constitution, a shade having a substantially equal size is projected on all the light receiving areas in a region through which the wiring is passed.

(Function)

Turning back to FIG. 1, an operation of the present embodiment will next be described.

The light beam emitted from the surface-emitting laser 1 forms the beam spot 80 on the pattern surface of the scale 2. The optical pattern 23 on the scale 2 is irradiated with the beam spot 80, and a diffractive interference pattern 82 formed by the reflected light from the optical pattern 23 is projected on the light receiving portion 4 of the photodetector 3. This diffractive interference pattern 82 is a light/dark pattern which has a period of a pitch p2 calculated from the equation (2), and the light/dark pattern moves on the light receiving portion 4 of the photodetector 3 with the movement of the scale 2.

The light receiving portion 4 outputs an output signal (photocurrent) based on the light/dark pattern. Using this output signal, the signal processing circuit obtains a difference between the outputs of the +A and −A groups to output the A-phase signal, and obtains a difference between the outputs of the +B and −B groups to output the B-phase signal. (In this processing, the same-phase signal component included in both the +A and −A groups is canceled. That is, the signal component by the external light which has the same phase in the light receiving areas of all the groups is canceled. Moreover, this also applies to the B-phase.)

Figure 7A:
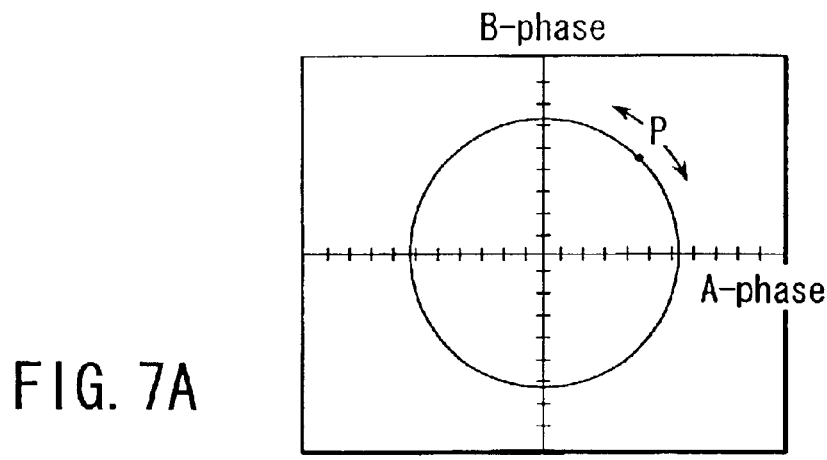
FIGS. 7A, 7B are explanatory views of an output signal from a light receiving portion according to the first embodiment of the present invention.
Figure 7B:
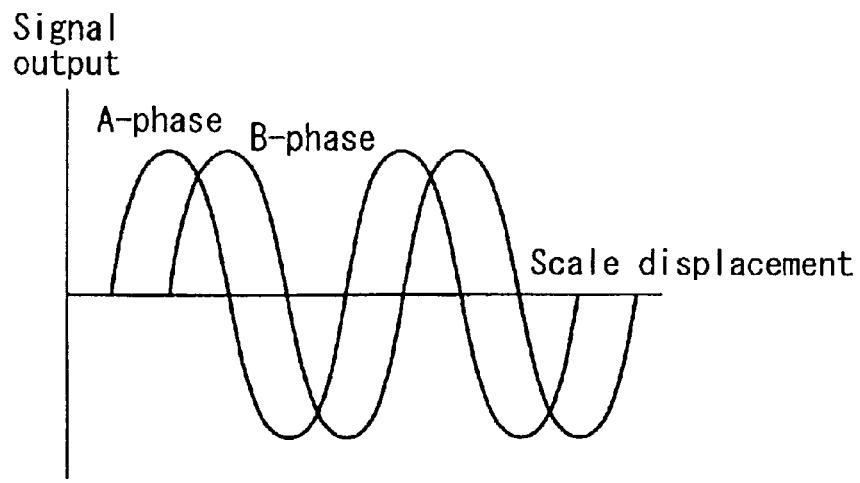

FIG. 7B shows an example of the output signals of the A, B phases. For the A and B phases, the phase deviates by a ¼ period of the period p2 of the diffractive interference pattern 13, that is, 90 deg. Moreover, FIG. 7A shows a Lissajous figure of the output signals of the A and B phases. When the output signals of the A and B phases are approximated by a sinusoidal, the Lissajous figure becomes circular. A point P in FIG. 7A shows a relative position of the scale 2 in a certain time with respect to the photodetector 3, and the point P moves on a circumference of the Lissajous figure with the movement of the scale. The direction in which the point P moves also changes in accordance with the direction in which the scale moves. Therefore, the position and movement direction of the scale are detected in accordance with the position and movement direction of the point P.

Moreover, the light source 1 and scale 2 are disposed as shown in FIGS. 5A, 5B, so that the regions 51, 52 of the diffractive interference pattern having a strong contrast are constituted so as not to be incident upon the light beam emission aperture of the surface-emitting laser 1 and so as to be incident upon the light receiving portion 4 of the photodetector 3. Therefore, the problem of a return light is solved. On the other hand, the light receiving portion 4 detects the signal by the region having a large contrast, and therefore the movement of the diffractive interference pattern is steadily detected.

That is, since a light beam having a large contrast never returns to the emission portion of the light source 1 from the scale 2, a more stable output is obtained from the light source. Moreover, the light shield metals 18 disposed in the region other than the light receiving portion 4 inhibits an electron/hole pair from being generated in the region. Therefore, a stable light beam intensity is obtained, and detection is performed with little error. Moreover, the wiring to the light source 1 is drawn out in the arrangement direction of the light receiving portion 4, the influence by the wiring to each group of the light receiving portion is set to be substantially uniform, and the influence onto a measured value is suppressed. Therefore, it is possible to minimize a measurement error even in a small-sized constitution.

Additionally, the present embodiment relates to a so-called reflection type optical encoder in which the light source and light receiving portion are disposed on the same plane and the major axis of the light source is disposed vertically to the scale 2 for generating the diffracted light. Here, a length of an optical path to the scale from the light source is set to be equal to that to the light receiving portion from the scale. That is, assuming that $z1=z2$ in the above-described equation (2), even with a change of a gap between the scale and light source (and the photodetector), $p2=2 \times p1$. The diffractive interference pattern generated on the light receiving surface of the light receiving portion 4 always agrees with the pitch of the arrangement of the light receiving portion 4, and a stable detection is possible.

In order to realize this, for example, the surface-emitting laser 1 may also be sunk in the photodetector 3 so that the light beam emission portion of the surface-emitting laser 1 has the same height as that of the effective light receiving surface of the photodetector 3. Moreover, a structure which raises the height of the effective light receiving surface of the light receiving area, such as a method of inserting a refractive index member for adjusting an optical distance into an optical path may also be used.

(Second Embodiment)

(Whole Constitution)

Figure 9:
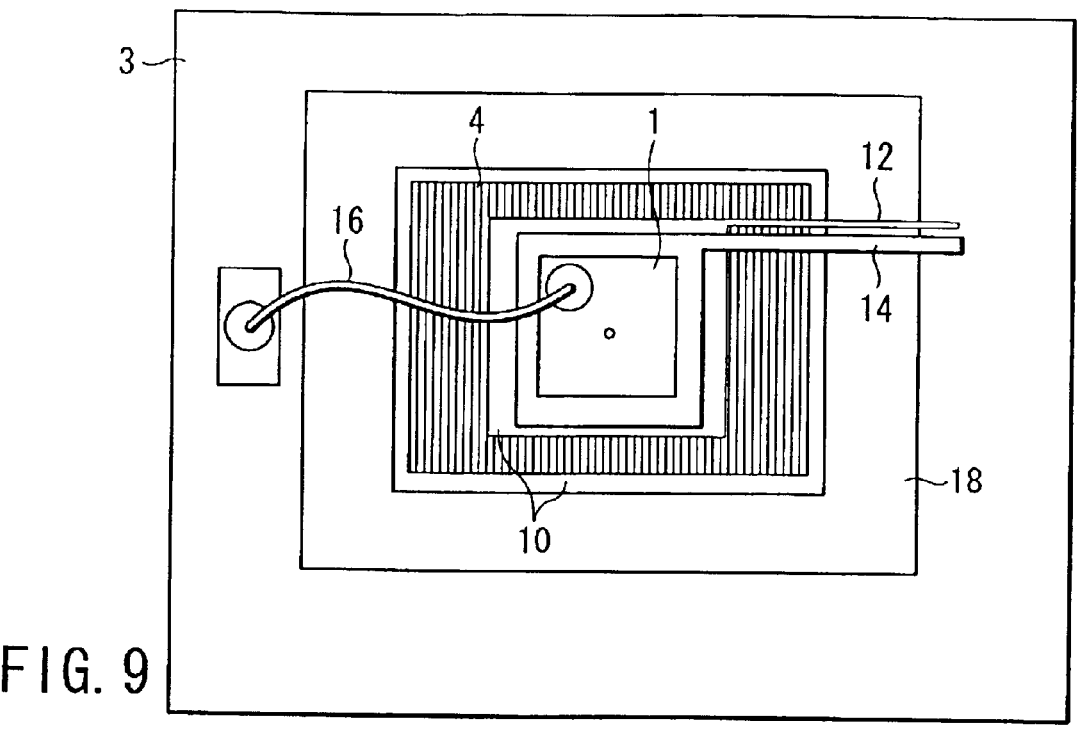
FIG. 9 is a plan view showing a constitution of the photodetector according to a second embodiment of the present invention.

In a second embodiment, the constitution of each member is similar to that of the first embodiment of the present invention shown in FIG. 1, and a basic operation is also similar to that of the first embodiment. Additionally, as shown in FIG. 9, the second embodiment is different from the first embodiment in that light receiving devices (dummy light receiving portions) 10 independent of the light receiving portion 4 are disposed in an outer peripheral portion of the light receiving portion 4 and in a region between the light source 1 and light receiving portion 4. That is, some of the light shield metals 18 in the first embodiment are replaced with the dummy light receiving portions 10.

Moreover, the dummy light receiving portions 10 are connected to a circuit (not shown) via a lead electrode 12 independently of the light receiving portion 4, and an electron/hole pair by the light incident upon the dummy light receiving portions 10 is passed into the circuit connected to the dummy light receiving portions 10. Furthermore, even if the light is incident upon the surface of the photodetector 3 outside the dummy light receiving portions 10, and the electron/hole pair is generated in the portion, first the light is absorbed by the dummy light receiving portions 10, and thereby unnecessary hole is prevented from entering a circuit system of the light receiving portion 4.

(Function)

By the above-described constitution, the electron/hole pair generated by the light incident upon the region other than the light receiving portion 4 is captured by the dummy light receiving portions 10, and the unnecessary electron/hole pair is prevented from flowing into the light receiving portion 4.

Additionally, the effect of eliminating the influence of the irradiation light onto the portion other than the light receiving portion 4 by the light shield metals 18 of the first embodiment does not have a difference from the effect by the dummy light receiving portions 10 of the second embodiment. However, it is preferable to dispose the dummy light receiving portions 10 in the following respect, because the error can further be reduced.

(Difference between First and Second Embodiments)

Among the lights incident upon the light receiving areas of the light receiving portion 4 of a certain part, the light passed to the substrate through a depletion layer and absorbed by the substrate forms an electron/hole pair in the substrate. In this case, since an electric field does not exist in the substrate under the depletion layer, migration occurs. The light is sometimes detected by the adjacent light receiving portion, and further by the light receiving portion adjacent to the adjacent light receiving portion. In this case, for example, a ratio of the light detected by an adjacent light receiving portion B in the light incident upon a light receiving portion A can be regarded as the same as a ratio of the light detected by the light receiving portion A in the light conversely incident upon the light receiving portion B. That is, an effect of migration is generated at an equal ratio in the light receiving portion to which the light receiving portions on opposite sides are adjacent. Therefore, it can be said that it is relatively easy to compensate for an error of the measured value of the light receiving portion.

On the other hand, when there is not the adjacent light receiving portion on one side, that is, with a so-called end light receiving portion, the effect of the migration is exerted only on one side. A measured value is indicated including an error different from that of the light receiving portion to which the light receiving portions on the opposite sides are adjacent. Therefore, it is difficult to treat the light receiving portion to which the light receiving portions on the opposite sides are adjacent in the same manner as the other light receiving portion to which the light receiving portion only on one side is adjacent, and to subject the portions to a compensation process.

Considering from the above, when the dummy light receiving portion is disposed, the effect of the migration can be regarded as substantially equal in all the light receiving portions (for use in output calculation), and the compensation process becomes easy. Therefore, in this respect, it can be said to be advantageous to dispose the dummy light receiving portion around the light receiving portion rather than to add the light shield metal.

(Third Embodiment)

(Whole Constitution)

Figure 10:
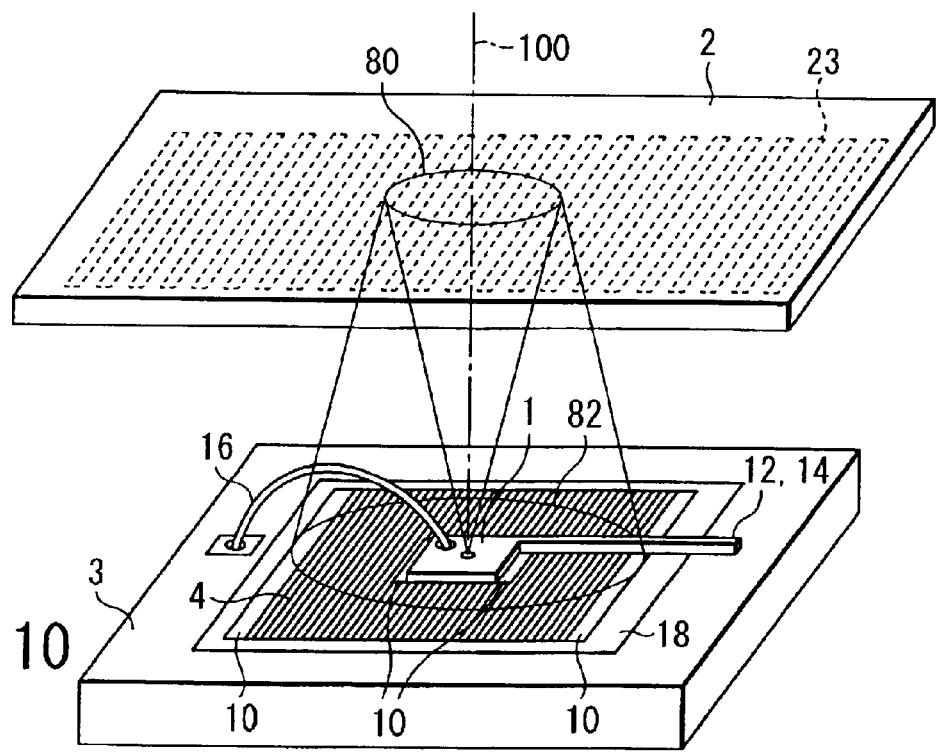
FIG. 10 is a perspective view showing a constitution of the optical encoder according to a third embodiment of the present invention.

FIG. 10 is a perspective view of a third embodiment. The third embodiment is constituted similarly as the first embodiment of the present invention shown in FIG. 1, and the basic operation is also similar to that of the first embodiment. Additionally, the third embodiment is different from the first and second embodiments in that both the light shield metal 18 and dummy light receiving portion 10 exist. Concretely, the dummy light receiving portions 10 are disposed between the surface-emitting laser 1 and light receiving portion 4 and in opposite ends of the light receiving portion 4 in the movement direction of the scale, and the light shield metal 18 is disposed to surround the light receiving portion 4 and dummy light receiving portions 10.

Figure 11:
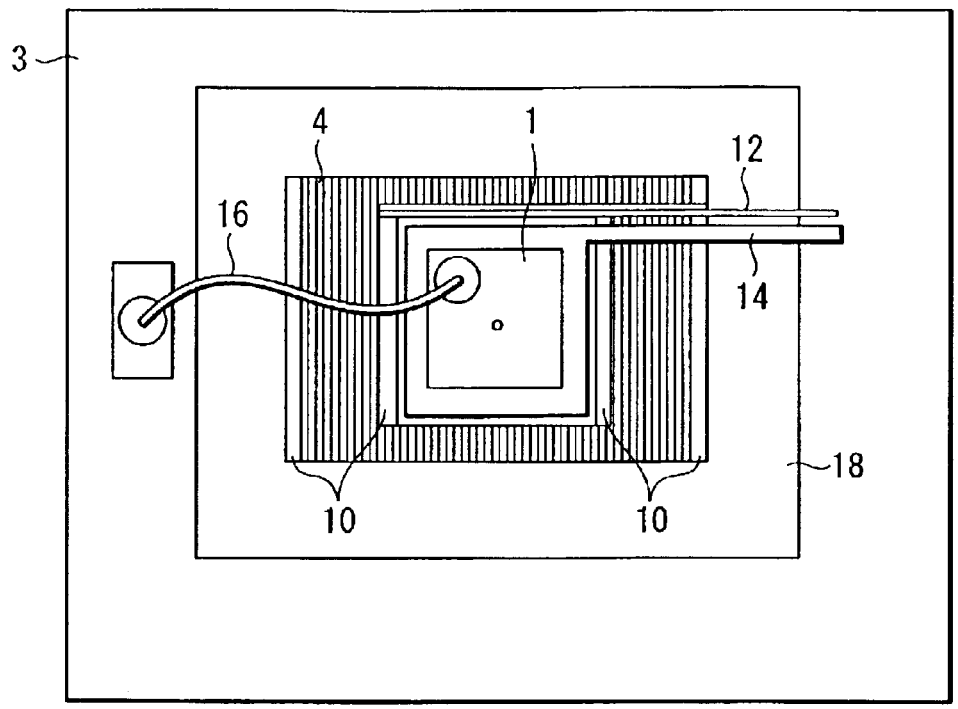
FIG. 11 is a plan view showing a constitution of the photodetector according to the third embodiment of the present invention.

FIG. 11 is a plan view of the photodetector 3 in the third embodiment. The surface-emitting laser 1 is disposed in the middle of the photodetector 3, and the light receiving portion 4 is disposed around the laser. This light receiving portion 4 is constituted of a plurality of light receiving areas arranged in the movement direction of the scale 2. The light shield metal 18 is disposed in the outer periphery of the light receiving portion 4 similarly as the first embodiment. Furthermore, the dummy light receiving portions 10 are formed in four places in total in the arrangement direction of the light receiving portion 4 between the light receiving portion 4 and light source 1 and between the light receiving portion 4 and light shield metal 18.

Figure 12:
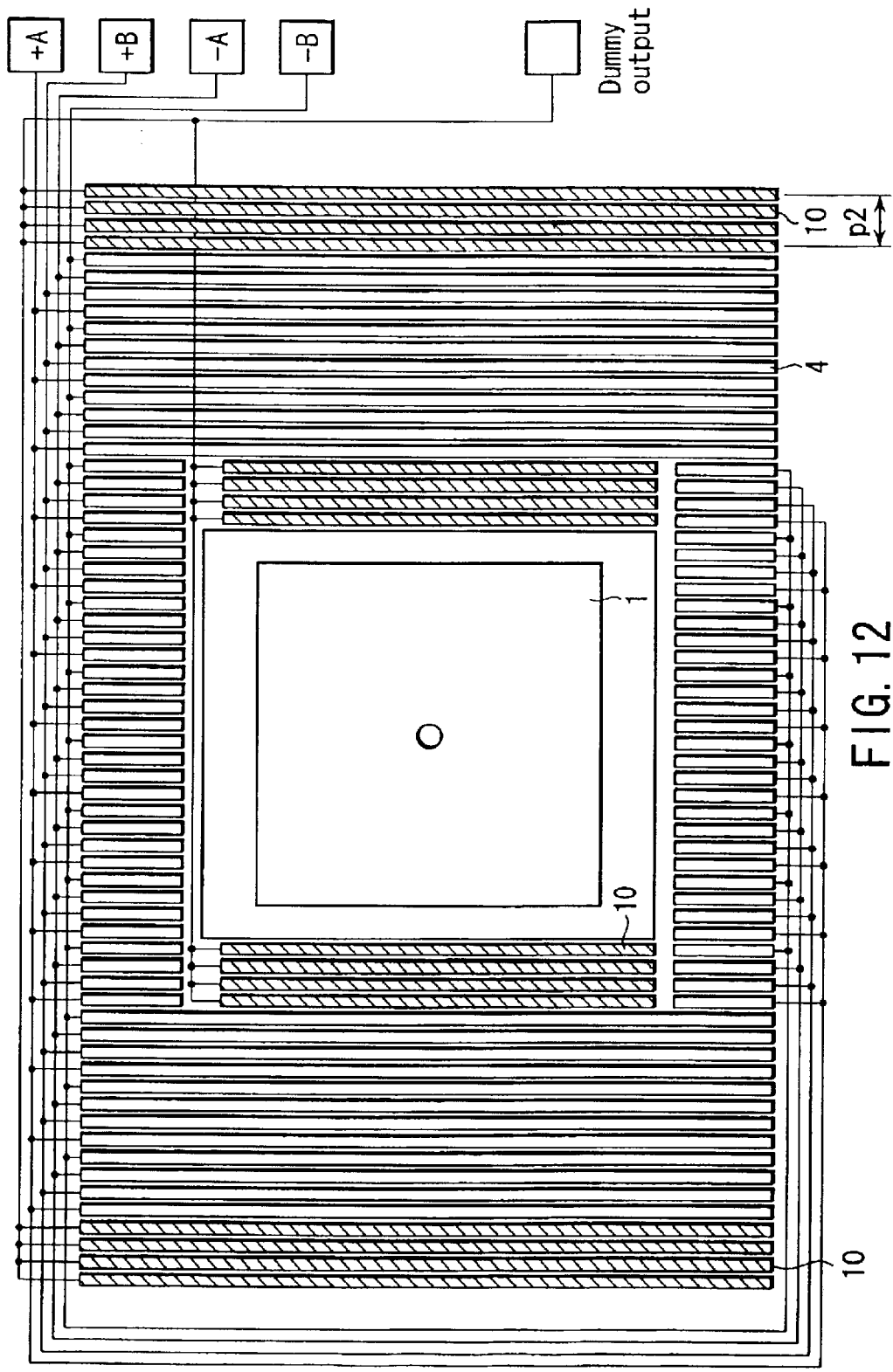
FIG. 12 is a diagram showing the light receiving portion wire connection of the photodetector according to the third embodiment of the present invention.

In detail, as shown in FIG. 12, for the light source 1, the light receiving portion 4 disposed around the light source, and the dummy light receiving portions 10, dummy light receiving area groups constituting the dummy light receiving portions 10 are disposed in four places in total including opposite ends of the light receiving portion 4 and two places of the light receiving portion adjacent to the light source.

Here, the size of each light receiving area constituting the dummy light receiving portion 10 is equal to that of each light receiving area of four adjacent groups +A, −A, +B, −B. That is, four light receiving areas each having the same size as that of the light receiving area constituting the light receiving portion 4 form the dummy light receiving areas (dummy light receiving portions 10). That is, the widths of the respective light receiving areas constituting the light receiving portion 4 and dummy light receiving portion 10 are equal, and the width is (p2)/4 (¼ period of the generated diffractive interference pattern, see the equation (2)).

Moreover, for electric connection, the light receiving portion 4 on the photodetector 3 formed in this manner is wired as shown in FIG. 12. That is, the outputs from the light receiving areas belonging to the respective groups (+A, −A, +B, −B) of the light receiving portion 4 are short-circuited for each group, and a sum of outputted photocurrents can be detected. On the other hand, the outputs from the light receiving areas belonging to the dummy light receiving portions 10 are all short-circuited, and connected to a processing circuit for dummy output (not shown).

Additionally, the light shield metal 18 is disposed to surround the photodetector 3 also including the dummy light receiving portions 10, and is constituted to eliminate the influence of the light incident upon a region in which the light receiving areas are not formed.

Moreover, when the number of light receiving areas constituting the dummy light receiving portions 10 is sufficiently increased, or when the width of the light receiving area is sufficiently increased, the influence of the light incident upon the light receiving portion 4 periphery can completely be removed. However, the photodetector 3 is then enlarged. To solve the problem, when the dummy light receiving portion having a width corresponding to about one period of the diffractive interference pattern is formed, the error has empirically been found to be sufficiently removed, and therefore the width of the dummy light receiving portion 10 is set to the width corresponding to one period of the diffractive interference pattern.

(Function)

By the above-described constitution, similarly as the above-described embodiments, the photocurrent generated in the light receiving portion 4 can be used to detect the movement of the scale 2.

Additionally, in a region other than a region including the light receiving portion 4 and dummy light receiving portions 10, the light shield metal 18 disposed in this region intercepts the incident light upon the region, and reduces the electron/hole pair generated in the region other than the light receiving portion. Furthermore, as described in the second embodiment, the dummy light receiving portion 10 disposed in the end of the light receiving portion 4 sets the influence of the migration causing "a peculiar error generated in the end of the light receiving portion 4" to be substantially equal to that in the region other than the end of the light receiving portion 4. This facilitates the compensation over the whole light receiving portion 4. As a result, it is possible to more easily detect the movement of the scale 2 with high precision.

It is to be noted that in the present embodiment, four light receiving areas each having a pitch obtained by dividing the width for one period of the diffractive interference pattern by four constitute one dummy light receiving portion 10. However, needless to say, even with one light receiving area having the same dimension as the pitch, the effect substantially similar to that of the above-described embodiment can be anticipated. Additionally, the light receiving device having the same dimension as that of the light receiving area of the light receiving portion 4 for one period of the diffractive interference pattern constitutes the dummy light receiving portion 10. In this case, even in the light receiving area disposed in the end of the light receiving portion 4, an environment in which the migration occurs can be handled in substantially the same manner as the other light receiving area. More preferably, as described in the embodiment, it is recommended that the dummy light receiving portion 10 be constituted of the light receiving area having the width for one period of the diffractive interference pattern at minimum and having the same width as that of the light receiving area of the light receiving portion 4.

Additionally, in the present embodiment, the dummy light receiving portion is disposed only in the movement direction of the scale 2. This is caused by the shape of each light receiving area of the light receiving portion 4. That is, the light receiving area forming the light receiving portion 4 is formed to be long in a longitudinal direction of the drawing (e.g., about 500 μm) and short in a lateral direction (about 10 μm), and a plurality of light receiving areas are arranged to form the light receiving portion 4. Therefore, in the ends of the left to right direction of the drawing, the specific group of light receiving areas is particularly strongly influenced, and an influence onto the output signal is large. However, in the vertical direction of the drawing, the whole is relatively influenced, and the influence onto the output signal is not very serious. Therefore, it is not essential to dispose the dummy light receiving portion on a light receiving area short side.

Figure 13:
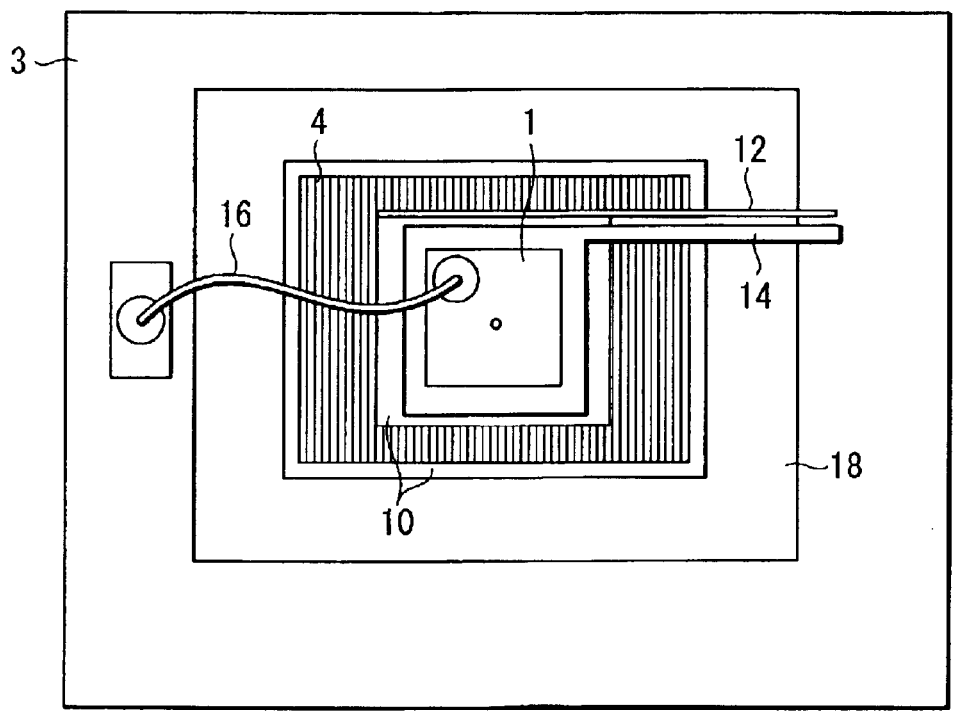
FIG. 13 is a plan view showing a modification example of the photodetector according to the third embodiment of the present invention.

Moreover, the dummy light receiving portion 10 is disposed in a whole boundary portion of the light receiving portion 4 and another region as shown in FIG. 13, and the light receiving portion 4 is surrounded with the dummy light receiving portion 10, so that more precision may be pursued.

(Fourth Embodiment)

(Whole Constitution)

In a fourth embodiment, the constitution of each member is similar to that of the third embodiment of the present invention shown in FIG. 10, the basic operation is also described in the third embodiment, and therefore a different respect from the third embodiment will mainly be described here.

Figure 14:
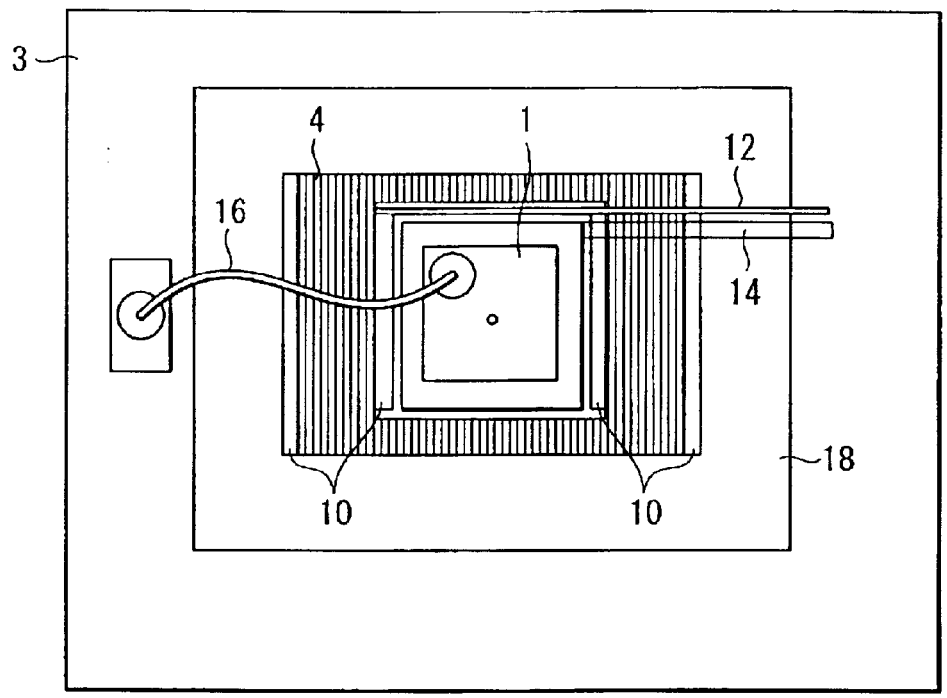
FIG. 14 is a plan view showing a constitution of the photodetector according to a fourth embodiment of the present invention.

FIG. 14 shows a top plan view of the photodetector 3 of the optical encoder constituted as shown in FIG. 10. FIG. 14 shows an example in which the wiring electrode 14 from the surface-emitting laser 1 and the lead electrode 12 from the dummy light receiving portion 10 are constituted of transparent electrodes. A protective film also serving as an interlayer insulating film (not shown) is formed by a silicon oxide film on the upper surface of the light receiving portion 4 of the photodetector 3, and further an oxide-based transparent electrode such as ITO is formed to ride over the upper surface of the light receiving portion 4. The wiring electrode 14 and lead electrode 12 are formed of the transparent electrodes in this manner.

(Function)

By the above-described constitution, the diffracted light from the scale to be incident upon the light receiving portion 4 is not intercepted by the wiring electrode 14 and lead electrode 12. Therefore, without deteriorating the sensitivity of the light receiving portion by the electrodes such as the wiring electrode, it is possible to electrically connect the surface-emitting laser 1 to the dummy light receiving portion 10.

(Modification Example)

Figure 15:
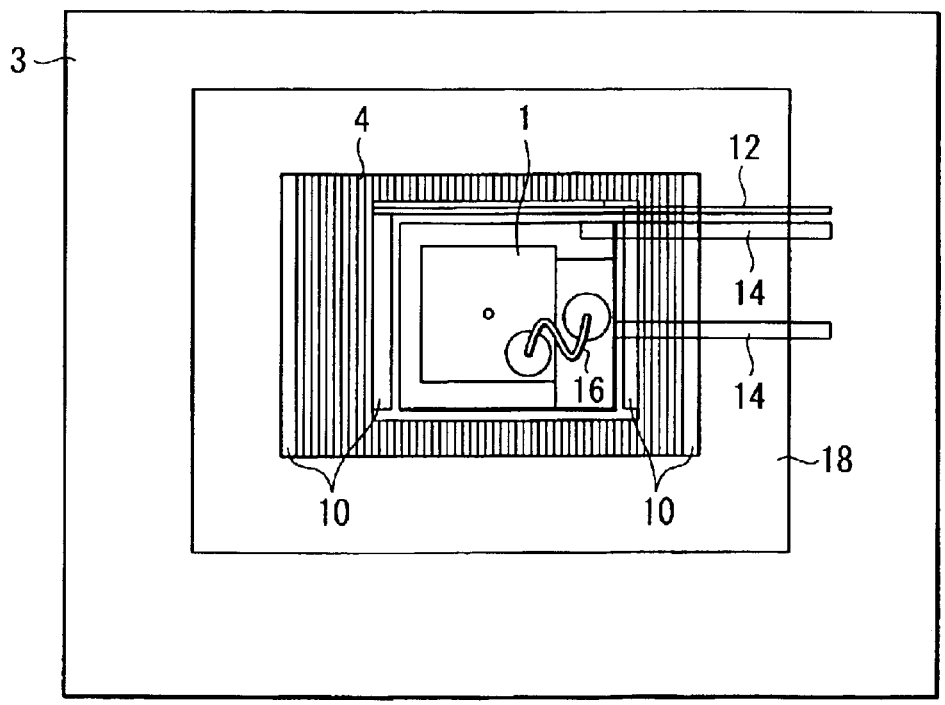
FIG. 15 is a plan view showing a modification example of the photodetector according to the fourth embodiment of the present invention.

FIG. 15 shows a modification example of the present embodiment. In the above-described embodiment, only the wiring electrode 14 and lead electrode 12 are the transparent electrodes. However, as shown in FIG. 15, an electrode pad of the bonding wire 16 is disposed in the vicinity of the light source 1, and the wiring electrode from the pad is formed of the transparent electrode, so that the influence of the shade of the bonding wire can be eliminated.

(Function)

By the above-described constitution, the shades by all the wirings to the light source and dummy light receiving portion 10, including the bonding wire 16, do not exist on the light receiving portion 4, the influence of the wiring can be minimized, and an encoder having good sensitivity and precision can be anticipated.

(Fifth Embodiment)

(Whole Constitution)

Figure 16A:
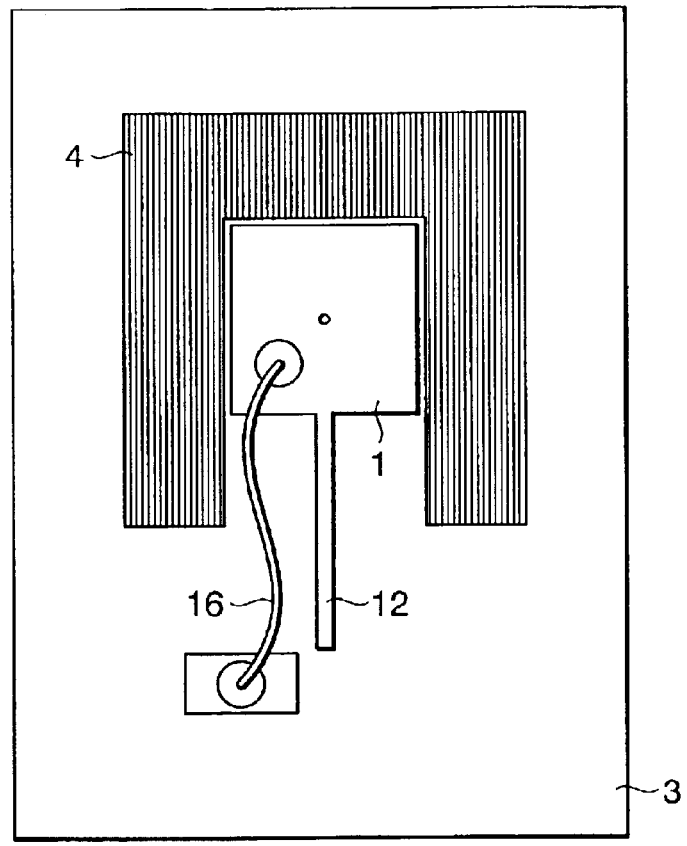
FIGS. 16A, 16B are plan views showing a constitution of the photodetector according to a fifth embodiment of the present invention.
Figure 16B:
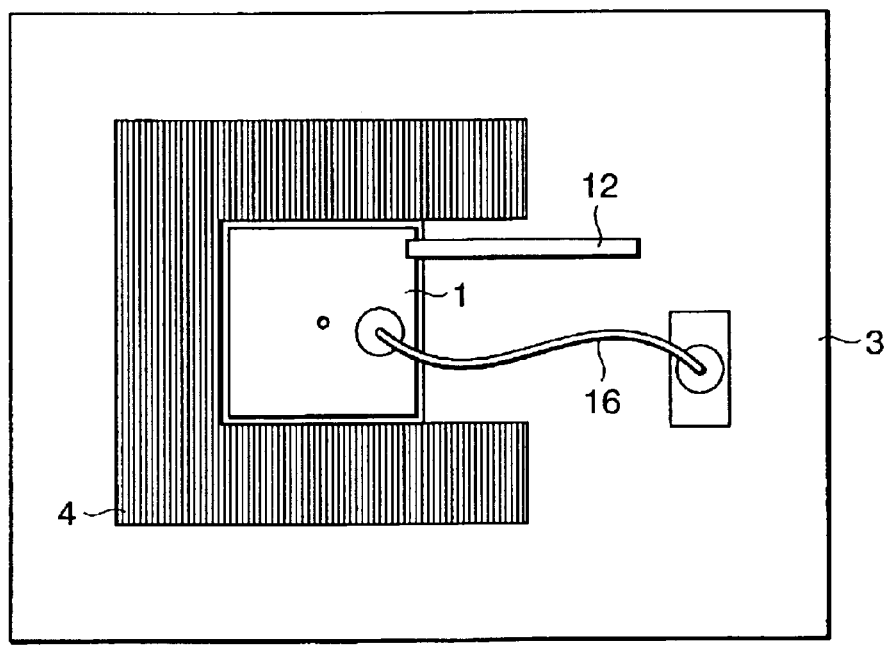
Figure 17A:
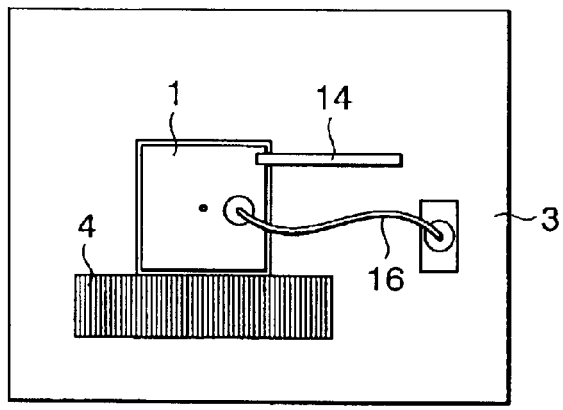
FIGS. 17A to 17D are plan views showing a modification example of the photodetector according to the fifth embodiment of the present invention.
Figure 17B:
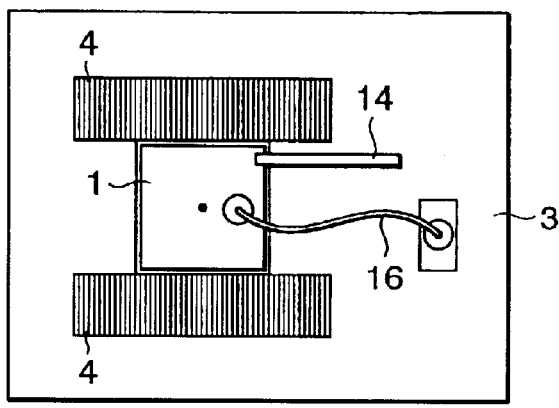
Figure 17C:
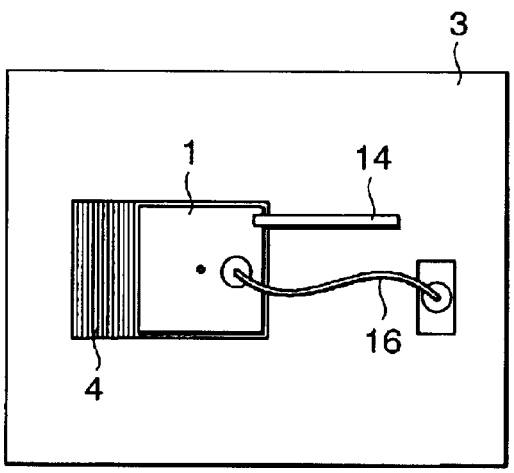
Figure 17D:
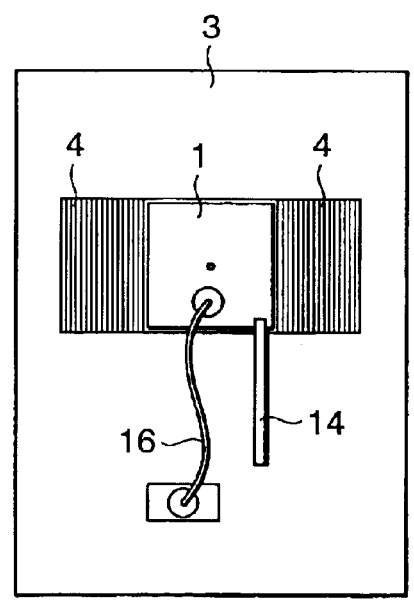
Figure 18A:
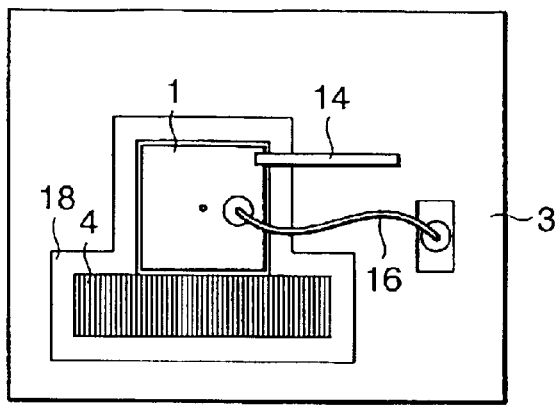
FIGS. 18A to 18D are plan views showing another modification example of the photodetector according to the fifth embodiment of the present invention.
Figure 18B:
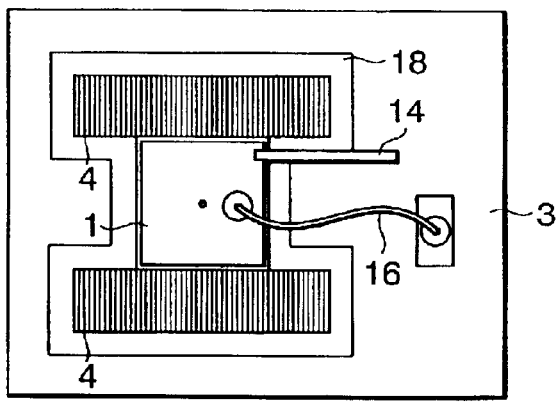
Figure 18C:
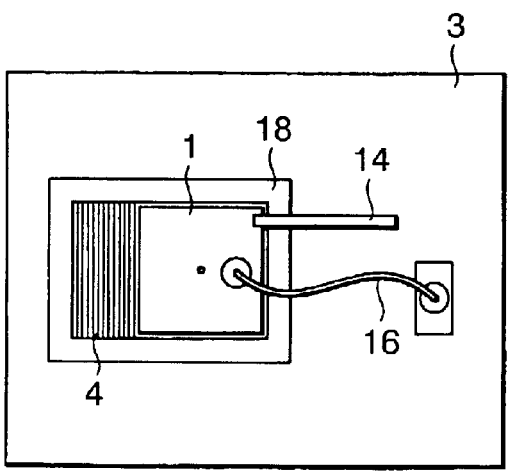
Figure 18D:
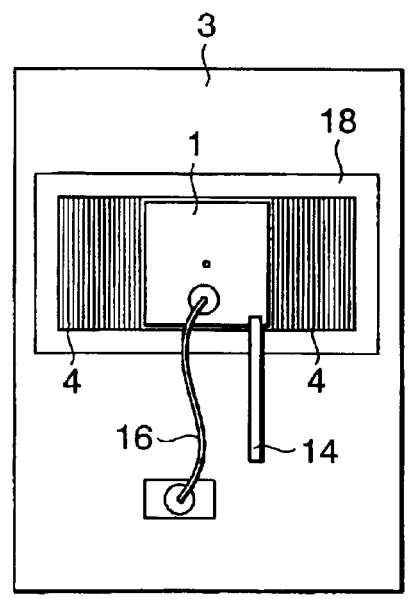
Figure 19A:
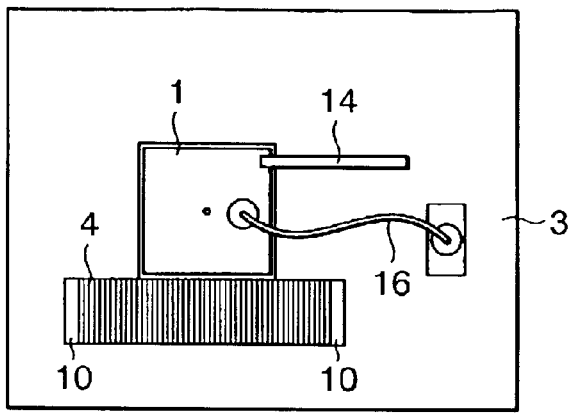
FIGS. 19A to 19D are plan views showing another modification example of the photodetector according to the fifth embodiment of the present invention.
Figure 19B:
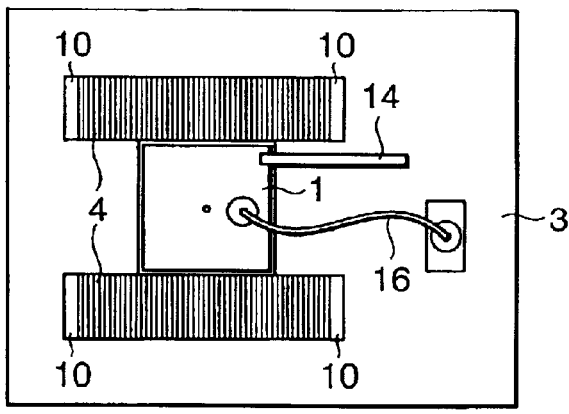
Figure 19C:
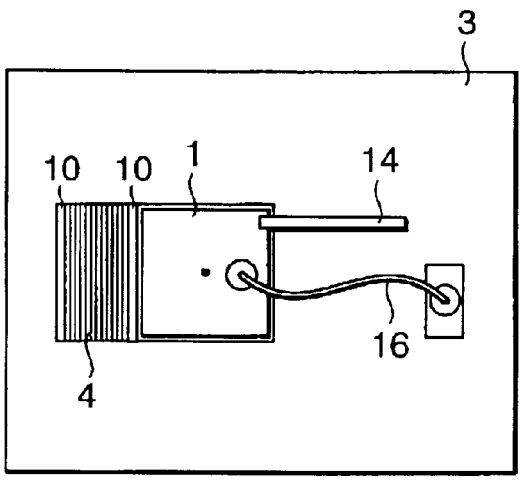
Figure 19D:
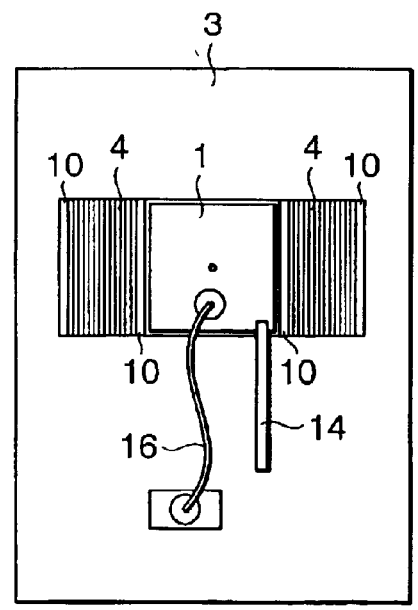
Figure 20A:
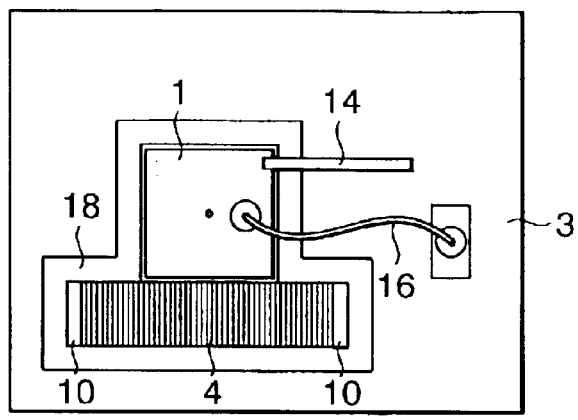
FIGS. 20A to 20D are plan views showing another modification example of the photodetector according to the fifth embodiment of the present invention.
Figure 20B:
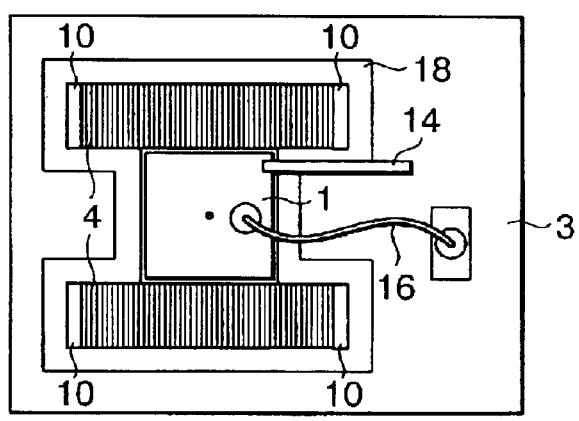
Figure 20C:
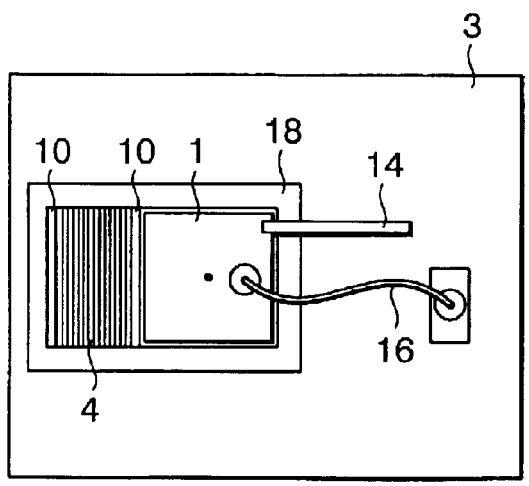
Figure 20D:
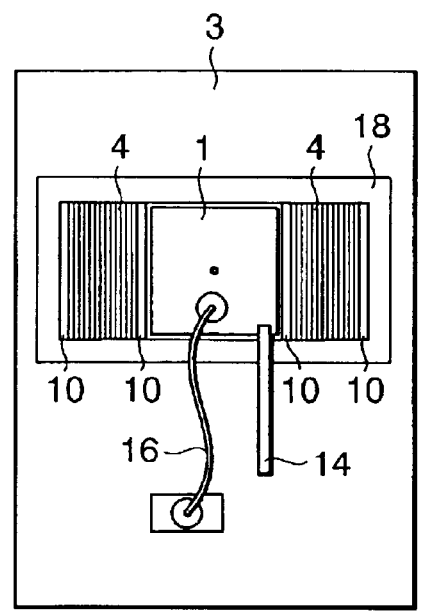
Figure 21:
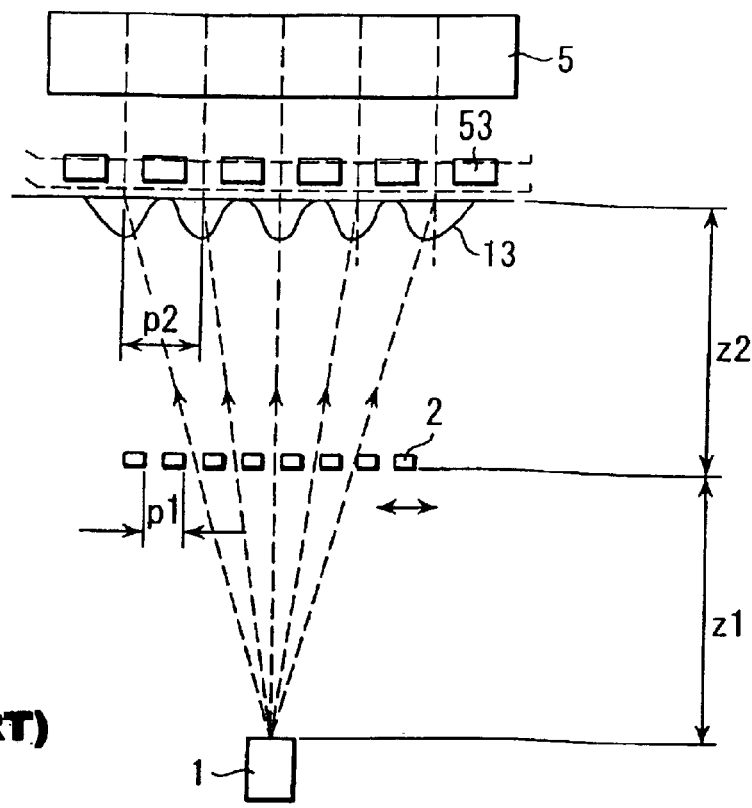
FIG. 21 is a diagram showing a constitution of a conventional optical encoder.
Figure 22:
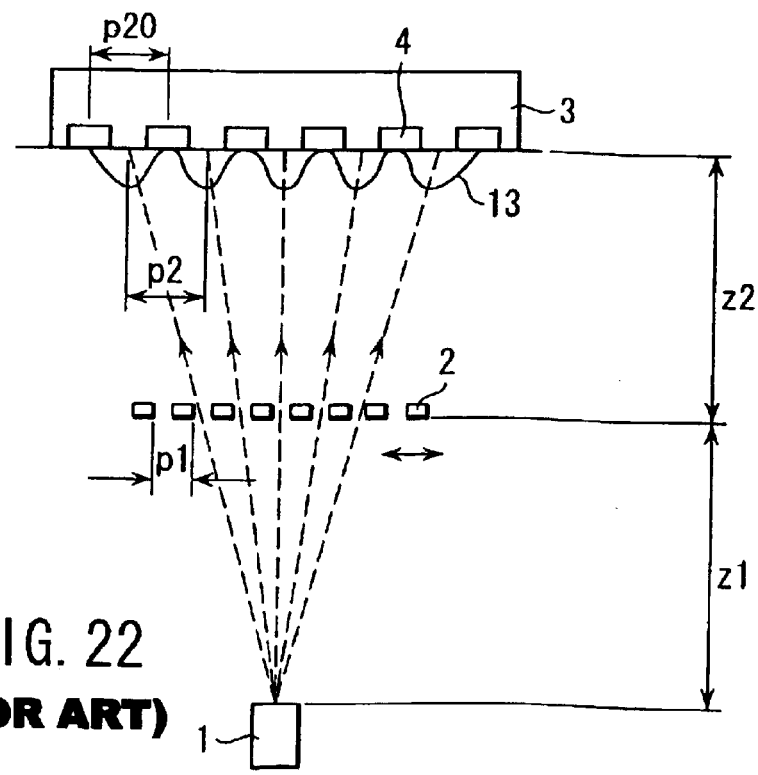
FIG. 22 is a diagram showing a constitution of another conventional optical encoder.
Figure 23:
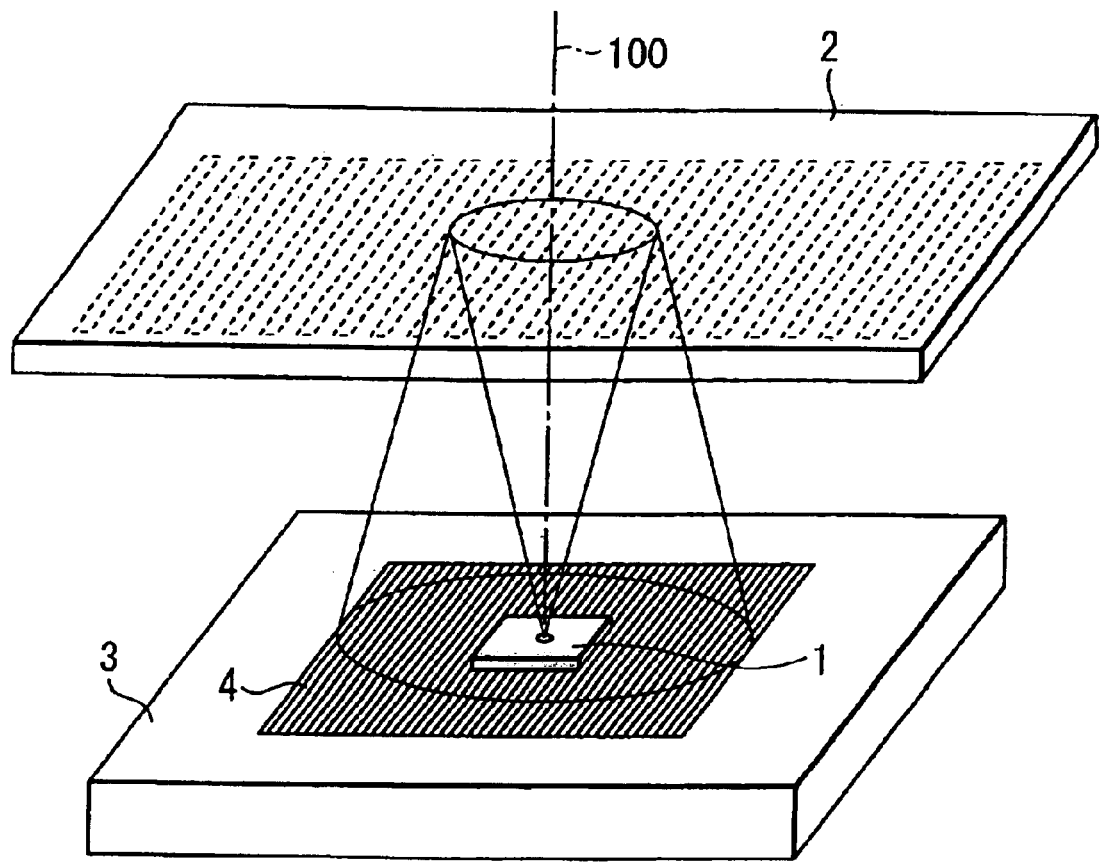
FIG. 23 is a diagram showing a constitution of the conventional optical encoder.
Figure 24A:
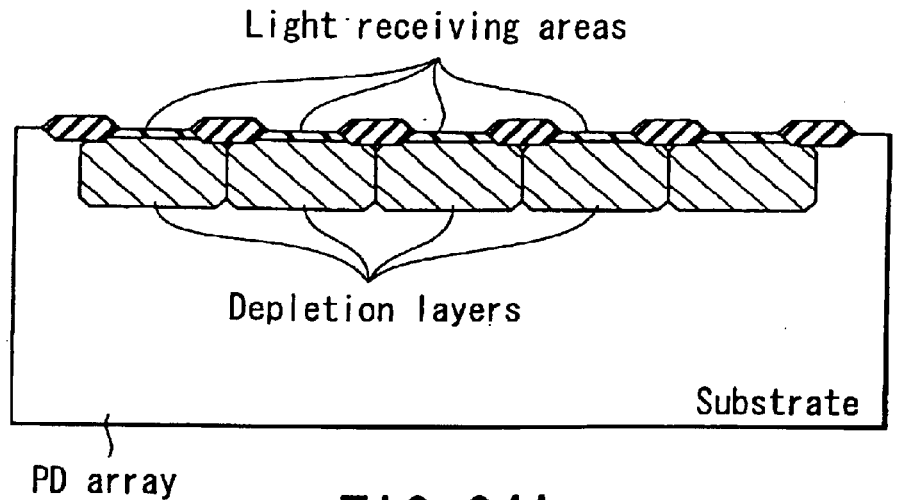
FIGS. 24A, 24B are explanatory views of a problem (influence of a light incident upon a light receiving portion periphery) of the conventional optical encoder.
Figure 24B:
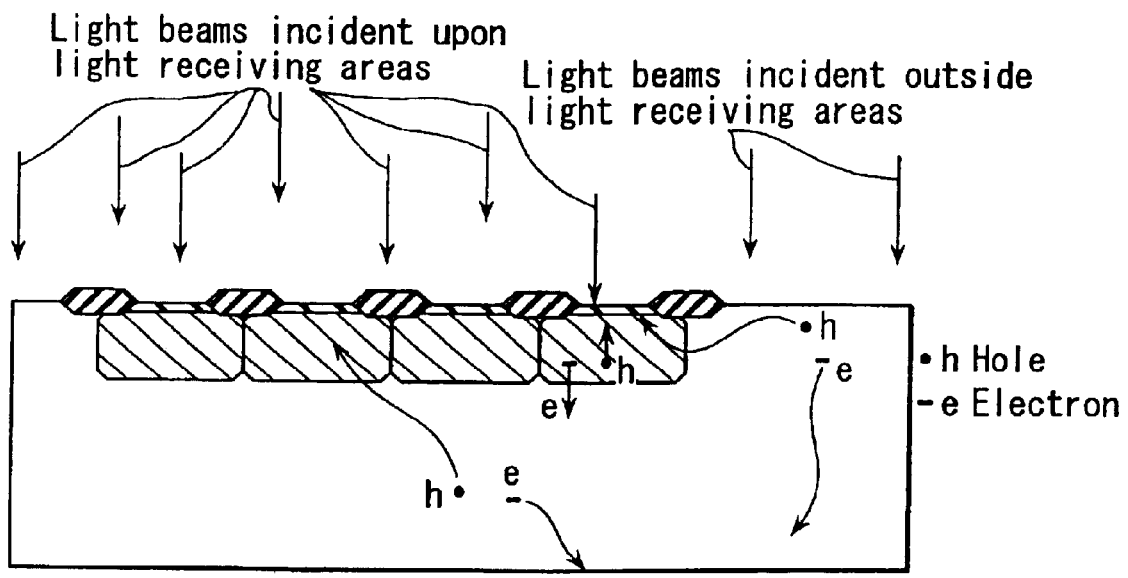
Figure 25:
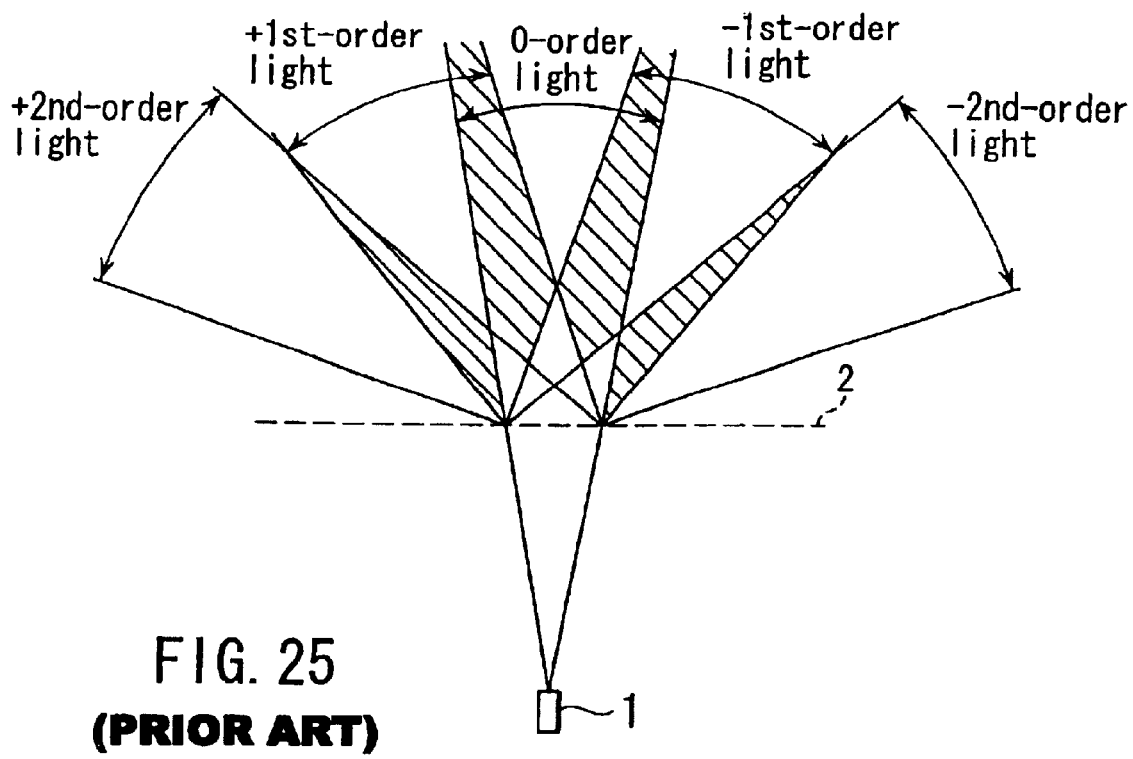
FIG. 25 is a diagram showing a diffraction grating, diffracted light, and interference generation area.
Figure 26:
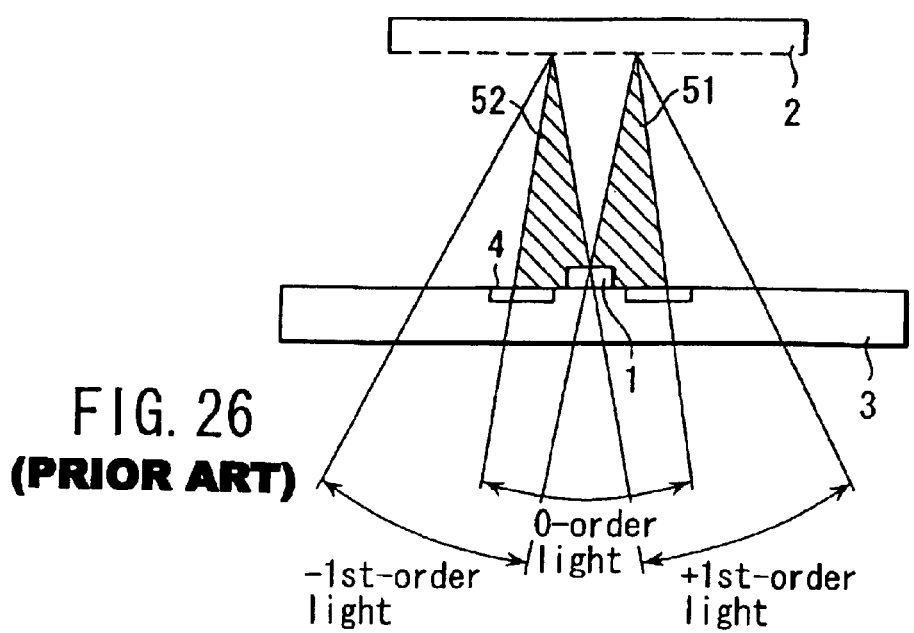
FIG. 26 is an explanatory view of arrangement of a light source having a high possibility that a light beam intensity of a laser light source becomes unstable.

FIGS. 16A, 16B show the constitution of the photodetector according to a fifth embodiment. In the drawings, the same members as those described in the first to fourth embodiments are denoted with the same reference numerals. For details of these members, refer to the description concerning the first to fourth embodiments, and the different respect from the third embodiment will be described hereinafter in an emphasized manner.

FIGS. 16A, 16B are top plan views of the photodetector 3 of the optical encoder constituted as shown in FIG. 1. Here, instead of surrounding the surface-emitting laser 1 with the light receiving portion 4, the light receiving portion 4 is formed only in three peripheral directions of the light source 1. Moreover, the lead electrode 12 and bonding wire 16 for the electric connection to the surface-emitting laser 1 are drawn from a direction in which the light receiving portion 4 does not exist. Here, the scale 2 not shown in FIGS. 16A, 16B is assumed to move in the left to right direction in the drawing. That is, in FIG. 16A, one side of the light receiving portion 4 surrounding the light source 1 in a direction vertical to the scale movement is omitted, and the wiring is disposed in the omitted portion. On the other hand, in FIG. 16B, one side of the light receiving portion 4 surrounding the light source 1 in a scale movement direction is omitted, and the wiring is disposed in the omitted portion.

(Function)

By the above-described constitution, the detection sensitivity drops because of a decrease of a region of the light receiving portion corresponding to the omitted light receiving portion, but the influence of the shade of the wiring incident upon the light receiving portion from the scale can be suppressed. For the omission of the light receiving portion, the same number of light receiving areas are removed with respect to all the respective groups +A, −A, +B, −B. Therefore, the incident light is equally reduced with respect to all the phases. Therefore, when an obtained result is amplified by an amplification circuit, a detection result having no error and having good precision is obtained.

FIGS. 17A to 20D show other embodiments. These are top plan views of the optical encoder shown in FIG. 1 similarly as FIGS. 16A, 16B. Any drawing shows a relation between the surface-emitting laser 1, and the arrangement of the wirings for connecting the light receiving portion 4 and light source 1. Similarly as FIGS. 16A, 16B, a lead wire is drawn in a direction in which the light receiving portion 4 is not disposed.

Concretely, FIGS. 17A to 17D show variations of an arrangement example of the light source 1, light receiving portion 4, and wiring.

Furthermore, FIGS. 18A to 18D show that the light shield metal 18 is disposed in the FIGS. 17A to 17D.

Moreover, FIGS. 19A to 19D show that the dummy light receiving portions 10 are disposed in the opposite ends of the light receiving portion 4 of FIGS. 17A to 17D.

Furthermore, FIGS. 20A to 20D show that the light shield metal 18 and dummy light receiving portions 10 are disposed as described in the third embodiment.

In the respective embodiments including the above-described modification examples, the stable laser output is obtained. Moreover, it is possible to suppress the error by the light incidence upon the light receiving portion periphery and the influence between the adjacent light receiving devices as error factors. Furthermore, the error can easily be compensated for.

According to the present invention, there is provided an optical encoder which is miniaturized and which has the stable output and good precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical encoder comprising:
    a coherent light source which emits a light beam;
    a scale which is apart from the coherent light source as much as a predetermined distance and which is relatively displaced to intersect the light beam and in which an optical pattern having a predetermined period is formed to generate a diffractive interference pattern by the light beam;
    a photodetector which detects the diffractive interference pattern generated by the optical pattern; and
    a dummy light receiving portion disposed in at least a part of a region adjacent to a light receiving portion disposed on the photodetector.

2. The optical encoder according to claim 1, wherein the coherent light source and light receiving portion are disposed on the same substrate, and the dummy light receiving portion is disposed between the coherent light source and light receiving portion.

3. The optical encoder according to claim 1, wherein the light receiving portion includes a plurality of light receiving area groups arranged in a spatial period direction of the diffractive interference pattern at a predetermined interval, and the dummy light receiving portion includes a plurality of light receiving area groups arranged at the same interval as the predetermined interval.

4. The optical encoder according to claim 2, wherein the light receiving portion includes light receiving areas of n groups which detect signals of phase regions obtained by dividing one period of the diffractive interference pattern by a natural number n, and one dummy light receiving portion is a light receiving area group including n light receiving areas.

5. The optical encoder according to claim 2, wherein a light shield member is disposed at least in a part of a region not included in the light receiving portion or the dummy light receiving portion among a region on the photodetector on which the diffractive interference pattern is projected.

6. The optical encoder according to claim 1, wherein a light beam emission portion of the coherent light source is disposed on a linear axis passed substantially through a center on the plane of the light receiving portion in the spatial period direction and crossing perpendicular to the spatial period direction, wherein the light receiving portion disposed on the photodetector comprises two or more light receiving area grouns arranged in the spatial period direction of the diffractive interference pattern, and each of the light receiving groups comprises light receiving areas which are electrically connected to each other; and the major axis of the light beam emitted from the coherent light source is disposed to be substantially vertical to the spatial period direction.

7. The optical encoder according to claim 1, wherein:

the photodetector includes two light receiving portions;

the coherent light source is provided on a substrate, and is interposed between the two light receiving portions;

at least one of the two light receiving portions is provided as light receiving area groups arranged in a spatial period direction of the diffraction interference pattern;

light receiving areas included in each of the light receiving area groups are electrically connected to each other; and a line extending between substantial centers of the two light receiving portions in the spatial period direction is substantially perpendicular to the spatial period direction, and a light beam emission portion of the coherent light source is provided on the line.

8. An optical encoder comprising:

a coherent light source which emits a light beam;

a scale which is apart from the coherent light source as much as a predetermined distance and which is relatively displaced to intersect the light beam and in which an optical pattern having a predetermined period is formed to generate a diffractive interference pattern by the light beam;

a photodetector which detects the diffractive interference pattern generated by the optical pattern; and a light shield member disposed in a region adjacent to a light receiving portion disposed on the photodetector.

9. The optical encoder according to claim 8, wherein the coherent light source and light receiving portion are disposed on the same substrate, and the light shield member is disposed in at least a portion between the coherent light source and light receiving area.

10. The optical encoder according to claim 1 or 8, wherein the light receiving portion of the photodetector is disposed to surround the coherent source and includes a plurality of light receiving area groups which are arranged substantially in a spatial period direction of the diffractive interference pattern, and each of which comprises light receiving areas electrically connected to each other and at least one of electric wirings connected to the coherent light source is provided in the spatial period direction of the diffractive interference pattern.

11. The optical encoder according to claim 10, wherein at least one of the electric wirings is a transparent electrode pattern.

12. The optical encoder according to claim 10, wherein the electric wiring provided substantially in a spatial frequency direction of the diffractive interference pattern is a bonding wire provided in the spatial period direction of the diffractive interference pattern.

13. The optical encoder according to claim 1 or 8, wherein the coherent light source is integrally formed with the photodetector on the same substrate in a hybrid or monolithic manner.

14. The optical encoder according to claim 1 or 8, wherein the coherent light source is a surface-emitting laser.

* * * * *